US005535211A

United States Patent [19]

Yano

[11] Patent Number: 5,535,211

[45] Date of Patent: Jul. 9, 1996

[54] COMMUNICATIONS NETWORK CONTROL METHOD

[75] Inventor: Takashi Yano, Tokyo, Japan

[73] Assignee: Ricoh Company, Ltd., Tokyo, Japan

[21] Appl. No.: 891,164

[22] Filed: May 29, 1992

[30] Foreign Application Priority Data

| | | | |
|---|---|---|---|
| May 30, 1991 | [JP] | Japan | 3-127070 |
| Dec. 10, 1991 | [JP] | Japan | 3-324916 |
| Mar. 13, 1992 | [JP] | Japan | 4-54034 |

[51] Int. Cl.$^6$ .......... H04L 12/44

[52] U.S. Cl. .......... 370/85.2; 370/94.3

[58] Field of Search .......... 370/94.3, 60, 61, 370/56, 85.2, 85.3, 94.1, 85.13, 93; 340/825.02, 825.5

[56] References Cited

U.S. PATENT DOCUMENTS

| | | | |
|---|---|---|---|
| 4,347,498 | 8/1982 | Lee et al. . | |
| 4,698,804 | 10/1987 | Flores et al. | 370/85.2 |
| 4,777,487 | 10/1988 | Boulton et al. | 370/85.2 |
| 4,809,362 | 2/1989 | Claus et al. | 370/94.3 |
| 4,885,742 | 12/1989 | Yano | 370/85.2 |
| 4,910,507 | 3/1990 | Shimizu et al. | 370/85.2 |
| 4,998,247 | 3/1991 | Irvine-Halliday | 370/94.1 |
| 5,079,766 | 1/1992 | Richard et al. | 370/85.3 |
| 5,228,027 | 7/1993 | Yamaguchi | 370/85.3 |

FOREIGN PATENT DOCUMENTS 58-40384 9/1983 Japan .

*Primary Examiner*—Wellington Chin
*Assistant Examiner*—Chau T. Nguyen
*Attorney, Agent, or Firm*—Oblon, Spivak, McClelland, Maier & Neustadt

[57] ABSTRACT

An interface device having a storage function is interposed between each of connections between node devices and transmit/receive stations. When input signals from one transmit/receive station and one node device are received at almost the same time, the input signal from the node device is temporarily stored in the interface device. The input signal stored in the interface device is read therefrom and output after the input signal from the transmit/receive station ends.

5 Claims, 28 Drawing Sheets

FIG. 27
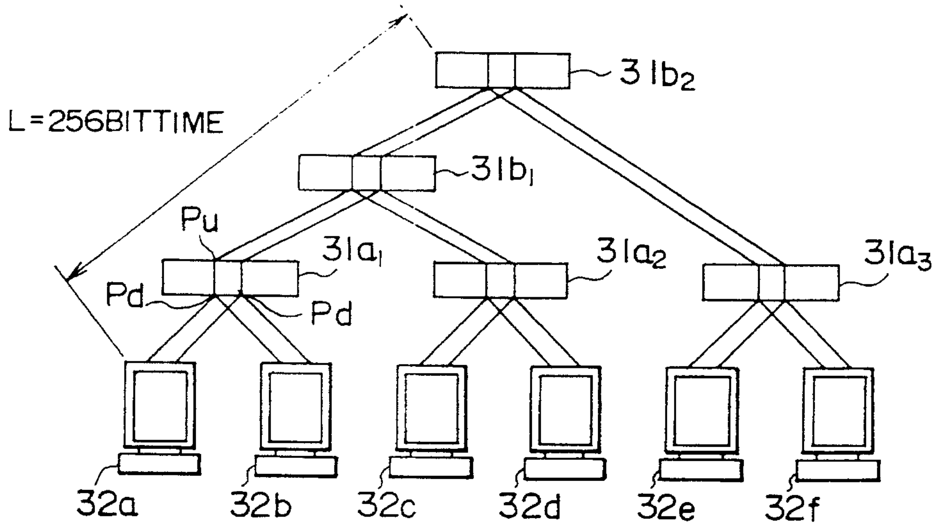
FIG. 28A
FIG. 28B
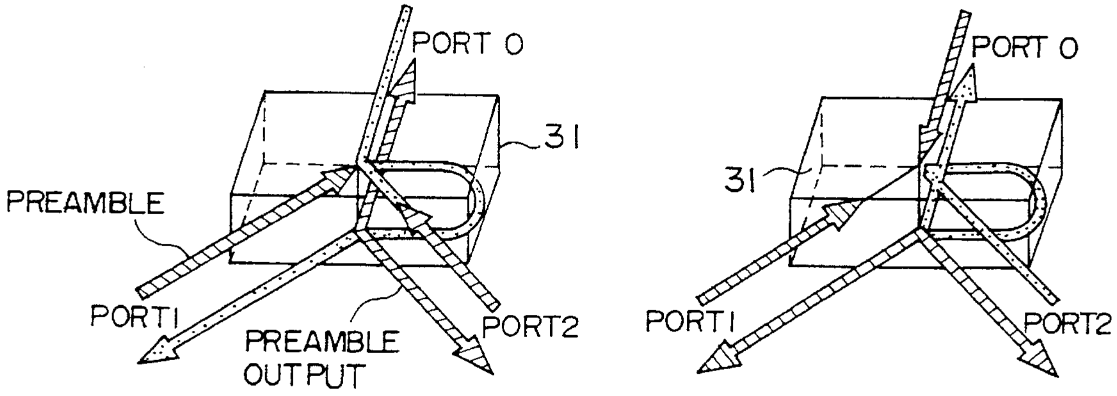
FIG. 28C
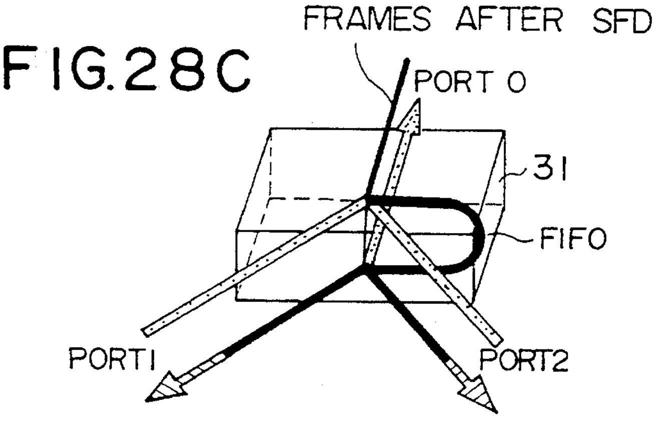

COMMUNICATIONS NETWORK CONTROL METHOD

BACKGROUND OF THE INVENTION

1. Field of the Invention

The present invention generally relates to a communications network control method, and more particularly to a communications network control method suitable for controlling the physical layer and the data link layer in a LAN (Local Area Network) protocol included in the OSI standard.

2. Description of the Prior Art

In LANs, a plurality of stations access a single transmission path in order to communicate with other parties. Nowadays, various methods for accessing such a transmission path have been available. For example, a LAN using a CSMA/CD (Carrier Sense Multiple Access with Collision Detection) system has been proposed. Examples of such a LAN are an Ethernet and Star LAN prescribed in the IEEE 802.3. Such a LAN has an advantage in that the protocol used in the LAN is simple. In the CSMA/CD system, a station checks for carrier presence in the transmission path before transmitting. If a collision occurs, the station stops transmitting and becomes back-off. The CSMA/CD system has a small amount of delay and a high transmission efficiency at light traffic. However, collisions often occur at heavy traffic, and throughput is limited. Further, as traffic increases, the amount of delay increases, while throughput decreases. Hence, it is necessary to use a data rate much higher than traffic. This increases the cost of constructing the system.

A LAN using a token system is known. Examples of such a LAN are a LAN using a token bus prescribed in the IEEE 802.4 and a LAN using a token ring prescribed in the IEEE 802.5. In the token system, stations acquire the right to transmit data before transmitting. At heavy traffic, the token system has a smaller amount of delay and a lower limit on throughput than the CSMA/CD system. However, even at light traffic, a delay is not so small. In addition, the system needs a complex protocol and is thus expensive.

Japanese Patent Publication No. 58-40384 discloses a CSMA/CD system, in which a packet is destroyed if a collision occurs and communications continuously take place. Thus, the delay at heavy traffic does not increase greatly, and data can be efficiently transmitted. However, collisions are detected by comparing the address of an outgoing packet with the address of an incoming packet. Such a process for the above comparison increases the cost, and does not conform to the IEEE 802.3 standard, the disclosure of which is hereby incorporated by reference. Hence, a full-duplex function must be added to the standard. In general, it is required that communications systems be capable of being used for various purposes and compatible with the existing standards. Communications systems which do not meet the existing standards degrade the value of products in the market.

With the above in mind, Japanese Laid-Open Patent Publication No. 1-119224 has been proposed by an applicant who is the assignee of the present application. According to this proposal, node devices are connected so that a tree-like hierarchical structure is formed. When a node device receives inputs at low-order direction ports, the first received input port is given priority over the other input ports. Thereby, an input at a high-order direction port is given priority. In this manner, one communication is necessarily established. The detection of collisions is carried out by determining whether or not signals are present at the input and output ports. A network interface device meets the IEEE 802.3 standard, and is less expensive than that proposed in the Japanese Patent Publication No. 58-40384. The throughput does not decrease at heavy traffic, and is superior, in this regard, to the Ethernet using the CSMA/CD system.

FIG. 1 is a graph of a throughput versus delay characteristic, which is well known as a means for evaluating the performance of a bus-type LAN. The throughput versus delay characteristic shows the relationship between a transmitted communication quantity and the waiting time until the communication is completed. FIG. 1 shows the throughput versus delay characteristics of the Ethernet using the CSMA/CD system and the prior art proposed in the Japanese Laid-Open Patent Publication No. 1-119224.

In a case where there are stations A, B and X, if an input signal (packet) from the station A to the station B approximately concurs with an input signal (packet) from the station B and the station X, and the former input signal arrives at the highest-order node prior to the latter input signal, the station B is no longer capable of receiving packets from the station A. Hence, in a network having a small number of networks which often perform transmitting, the throughput characteristic is deteriorated.

FIG. 2 is a graph of a throughput characteristic of the system disclosed in the Japanese Laid-Open Patent Publication No. 1-119224 obtained at heavy traffic. The system has a problem at light traffic. Further, in the above-mentioned system, the station A cannot determine if packets transmitted by the station A have been received by the station B. This determination procedure depends on TCP. However, this degrades efficiency and responsivity.

Consequently, it is desired that in any case, the packet received by the highest-order node prior to the other packets be propagated through the network without being damaged, and thereby an ideal throughput characteristic be obtained at heavy traffic.

SUMMARY OF THE INVENTION

It is a general object of the present invention to provide a communications network control method in which the above disadvantages are eliminated.

A more specific object of the present invention to provide a communications network control method having high throughput at heavy traffic.

The above objects of the present invention are achieved by a method of controlling a communications network which includes a plurality of node devices connected in a tree-like hierarchical structure, each of the node devices having a single high-order direction port and a plurality of low-order direction ports, the communications network including a plurality of transmit/receive stations each being connected to one of the node devices, each of the transmit/receive stations having an input port and an output port and transmitting a signal when there is no signal at the input port, the method comprising the steps of:

(a) broadcasting, in the communications network, a first-arrival signal which is first received by a highest-order node device out of the node devices, the first-arrival signal being one of signals which are transmitted by some of the transmit/receive stations at almost the same time, signals other than the first-arrival signal being discarded;

(b) storing, in an interface device provided in each of connections between the transmit/receive stations and the node devices, a first input signal received from one of the node devices approximately concurrently with a second input signal from one of the transmit/receive stations; and (c) transmitting the first input signal received from the one of the node devices and stored in the step (b) to a destination transmit/receive station after the second input signal from the one of the transmit/receive stations ends.

The above-mentioned objects of the present invention are also achieved by a method of controlling a communications network which includes a plurality of node devices connected in a tree-like hierarchical structure, each of the node devices having a single high-order direction port and a plurality of low-order direction ports, the single high-order direction port having priority over the low-order direction ports, each of the low-order direction ports having priority over other low-order direction ports when each low-order direction port has a first-arrival input signal, the communications network including a plurality of transmit/receive stations each being connected to one of the node devices, each of the transmit/receive stations having an input port and an output port and transmitting a signal when there is no signal at the input port, the low-order direction ports of each of the node devices being connectable to another node device or some of the transmit/receive stations, the method comprising the steps of:

(a) selecting, at each of the node devices, one of input ports included in the high-order direction port and the low-order direction ports;

(b) temporarily storing a first input signal received at a selected input port selected by the step (a) when a second input signal arrives at the input port of the high-order direction port after an SFD (Start Frame Delimiter) part of the first input signal received at the selected input port and subsequent to a preamble of the first input signal is detected; and (c) transmitting the first input signal stored at the step (b) via one of the low-order direction ports after a time equal to a minimum packet interval.

BRIEF DESCRIPTION OF THE DRAWINGS

Other objects, features and advantages of the present invention will become more apparent from the following detailed description when read in conjunction with the accompanying drawings, in which:

FIG. 27 is a block diagram showing a topology of the EC2;

FIGS. 28A, 28B and 28C are diagrams showing a routing algorithm of the node device;

DESCRIPTION OF THE PREFERRED EMBODIMENTS

Figure 1:
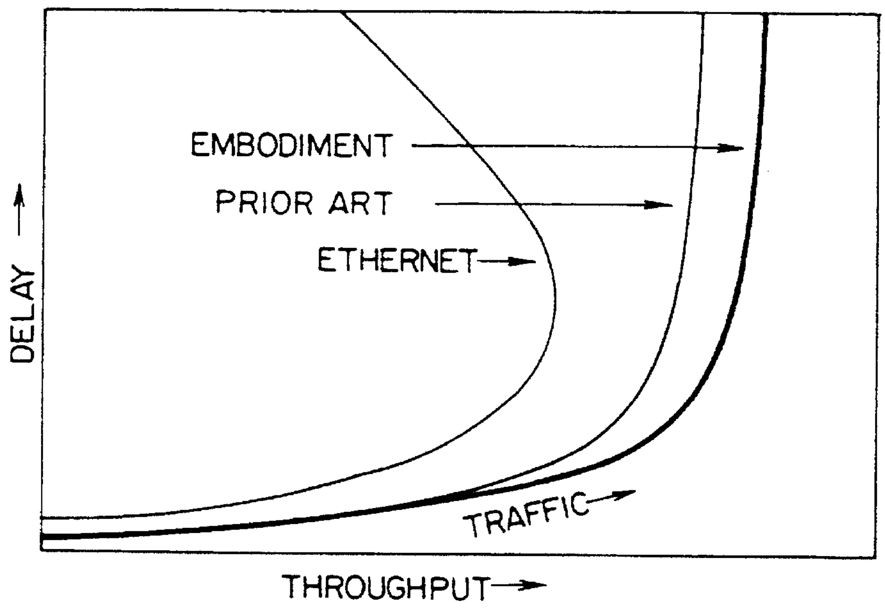
FIG. 1 is a graph showing a throughput versus delay characteristic.

To facilitate a better understanding of the present invention, a description will now be given, with reference to FIGS. 3A through 3D, of an algorithm of an Ethernet concentrator proposed in the Japanese Laid-Open Patent Publication No. 1-119224. This is a LAN designed to avoid destruction of packets due to collisions, and an algorithm for avoiding the destruction of packets is referred to as CSMA/CP (Carrier Sense Multiple Access with Collision Proof). As shown in FIGS. 3A through 3D, the network is formed so that it has a tree-like hierarchial structure. The network includes a highest-order node 1*a*, and lowest-order nodes 1*b*. These nodes 1*a* and 1*b* are the same as each other. Transmit/receive stations 2 are connectable to any of the nodes 1*a* and 1*b*. It is also possible to configure the network so that it has only one node 1. Each node device is a CN220 node, which has three low-order direction ports having an optical data link structure, and which has a pulse width distortion correcting function in lieu of a retiming function. Further, each node device performs a port selecting control and a one-bit output interrupting control. That is, each node device selects the first-arrival input port when input signals arrive at a plurality of low-order ports, and controls a priority selection when an input signal arrives at the high-order port. Further, each port stops one-bit outputting for priority selection performed at the time if switching an output message when an input signal arrives at the high-order port after an input message arrives at one of the low-order ports. Interface devices 3 are respectively interposed between the nodes device 1 and the transmit/receive stations 2. Each interface device 3 is an interface device for use in stations, which is called a 10B5 adapter and has been in practical use. The low-order direction ports of each interface device 3 are directly connected, through DB15 connectors, to transceiver cable connectors of the corresponding sender/receiver station 2, and supplied with electricity. Further, each interface device 3 has a signal conversion function between the low-order port (RS422) thereof and the high-order port (optical data link), and a collision presence output function. That is, each interface device 3 functions to a collision when input signals arrive at both the low-order port and the high-order port, and functions to make the low-order port output a collision presence when the collision is detected.

Figure 3A:
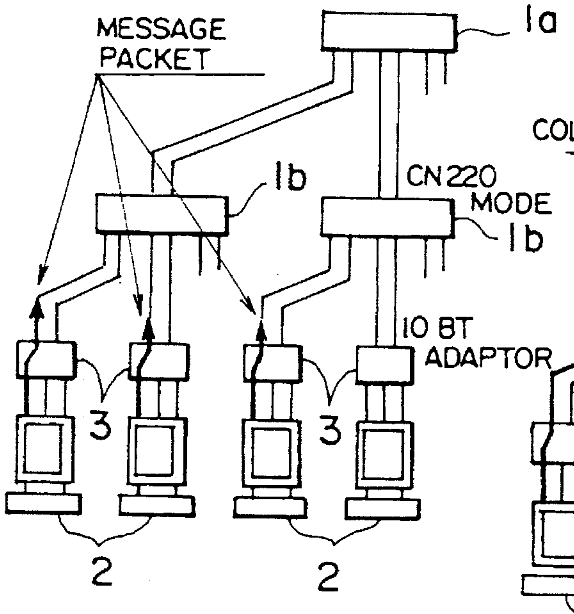
FIGS. 3A, 3B, 3C and 3D are diagrams showing a conventional network structure.
Figure 3B:
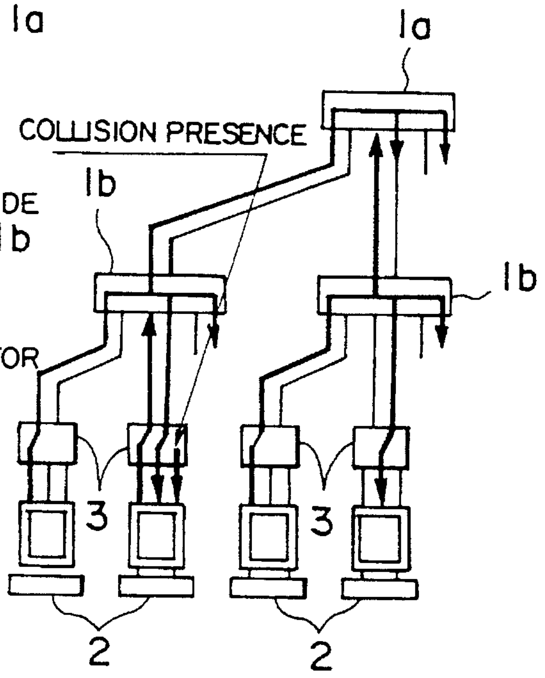
Figure 3C:
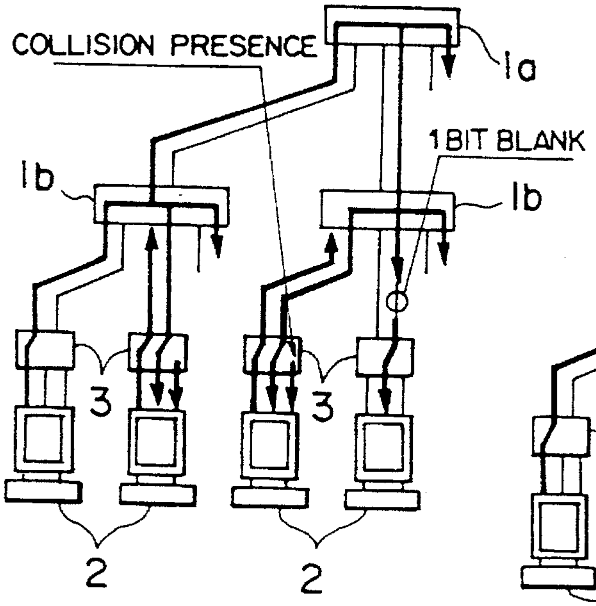
Figure 3D:
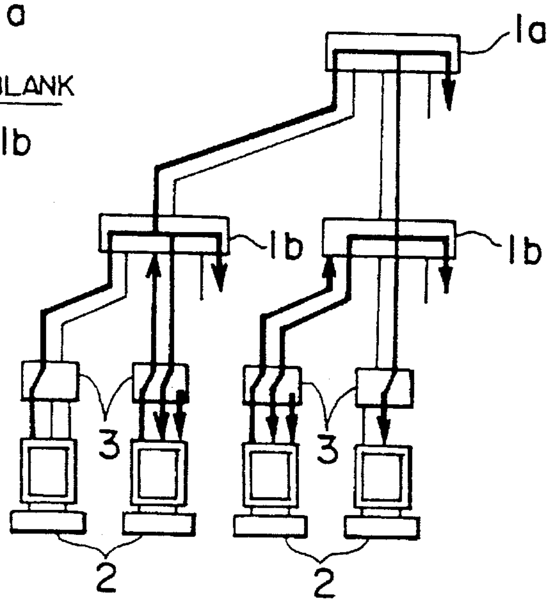

In the above-mentioned structure, the CSMA/CD has two algorithms. The first algorithm is a willow routing algorithm. As shown in FIG. 3A, each transmit/receive station 2 confirms that there is no carrier, and sends a message packet. When an input message arrives at one of the low-order ports, each node device 1 outputs the input message via its high-order port or one of the other low-order ports, as shown in FIG. 3B. If input messages arrive at a plurality of low-order ports, the input messages are output via all the low-order ports, as shown in FIG. 3C. If the first arrival message is obtained at one of the low-order ports, the high-order port is selected. In order to prevent an SFD of an Ethernet packet from occurring at that time, the outputting from the low-order ports other than the low-order port at which the first arrival of input message obtained is ceased by one bit (one-bit blank), and the input message from the high-order port is output. As a result, as shown in FIG. 3D, the message sent by the transmit/receive station 2 is propagated through the willow-type network without collisions. If a plurality of transmit/receive stations 2 output messages at almost the same time, only the first-arrival message which first arrived at the highest-order node device 1 is propagated through the network. In FIG. 3D, the message indicated by a thick solid line is propagated through the network.

The second algorithm of the CSMA/CP is a collision presence algorithm. As shown in FIG. 3A, when an input message arrives at one of the station-side ports of the interface device 3, the interface device 3 outputs the input message to the node device 1 via the node-side port thereof. If there is no message at the station-side port and there is a message at the node-side port, as shown in FIG. 3B the message is output from the station-side port to the transmit/receive station 2. If there are messages at both the station-side port and the node-side port, as shown in FIG. 3C the collision presence signal is sent to the transmit/receive station 2 from the station-side port. In response to receipt of the collision presence signal, the transmit/receive station 2 confirms that there is no receipt of carriers and the collision presence signal, and thereafter retransmits the message. That is, each transmit/receive station 2 sees the Ethernet concentrator as shown in FIGS. 3A through 3D as the complete Ethernet.

The present invention is concerned with improvements in the tree-like hierarchical network structure as described above.

Figure 4:
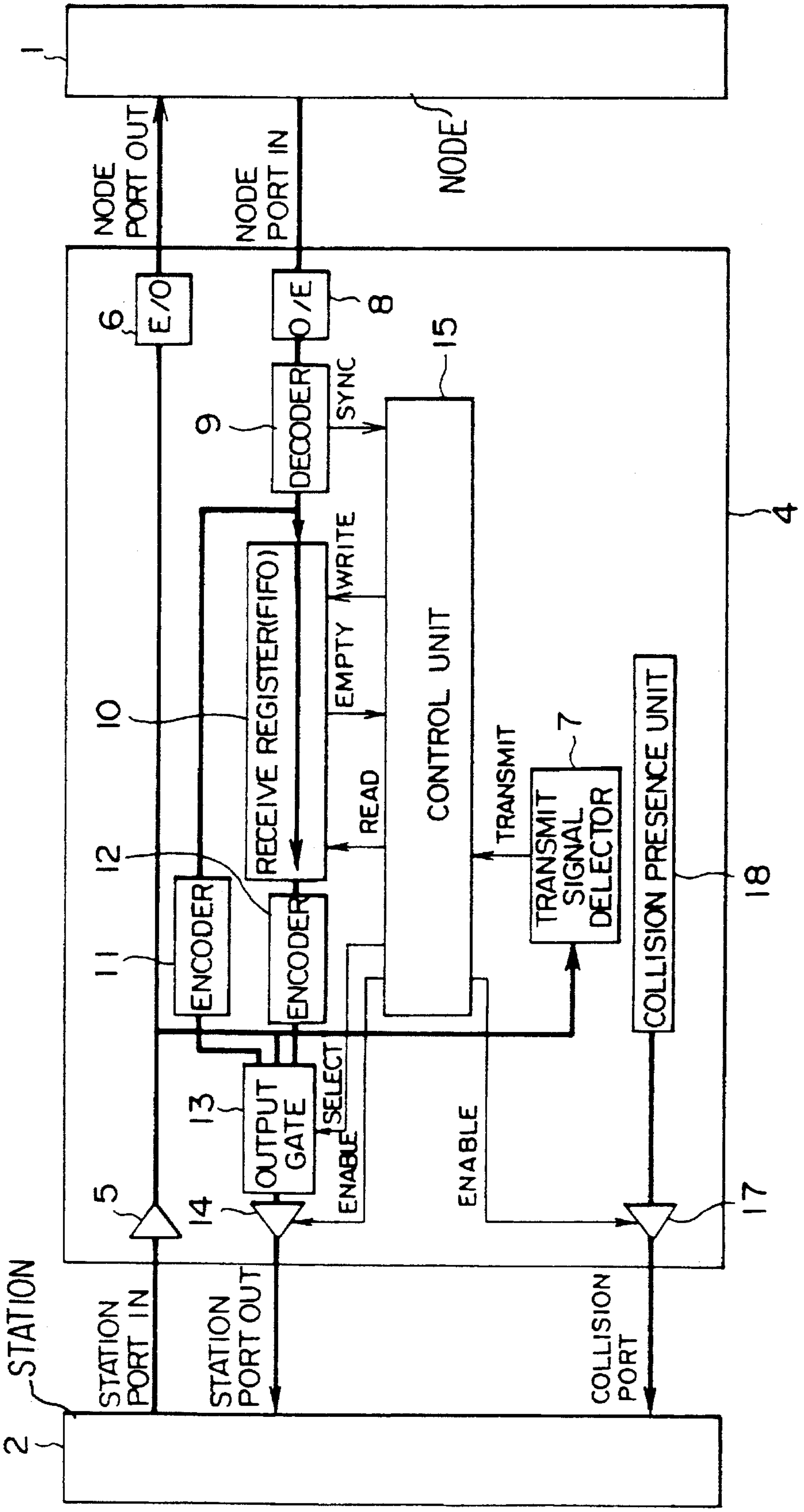
FIG. 4 is a block diagram of an interface device according to a first embodiment of the present invention.

A description will now be given, with reference to FIGS. 4 through 11, of a first embodiment of the present invention. An interface device 4 shown in FIG. 4 is replaced with the above-mentioned interface device 3. Referring to FIG. 4, the interface device 4 is connected to the transmit/receive station 2 via a station-side input port (Station Port in), a station-side output port (Station Port out), and a collision port, and is connected to the node device 1 via a node-side input port (Node Port in) and a node-side output port (Node Port out). A receiver 5 is provided in the station-side input port, and is connected to the node-side output port via an E/O data link 6, and connected to a transmit signal detector 7. An O/E data link 8 is provided in the node-side input port. A receive register 10, which has an FIFO memory structure and serves as a memory device, is connected to the node-side input port via a decoder 9. More specifically, the receive register 10 has a storage capacity larger than or equal to 111 bits (a delay in going and returning propagation between the interface device 4 and the transmit/receive station 2; 1.4 μs+a jam signal length; 48 bits+a minimum packet interval; 9 μs—a preamble deletion; 47 bits). An encoder 11 is directly connected to the decoder 9, to which an encoder 12 is connected via the receive register 10. These encoders 11 and 12 are connected, together with the receiver 5, to an output gate circuit 13. A transceiver 14 corresponding to the station-side output port is connected to the output gate circuit 13. A control unit 15 controls the above-mentioned structural elements. The control unit 15 counts 47 bits of a synchronizing signal Sync and then writes a packet signal into the receive register 10. A receive signal detector 16 is connected to the control unit 15. A transceiver 17 is provided at the collision port, and a collision presence unit 18 is connected to the transceiver 17. The collision presence unit 18 outputs a 10 MHz signal.

The network structure including interface devices, each being configured as shown in FIG. 4, has the following transmit and receive operations, and an operation executed when a collision has occurred.

Figure 5:
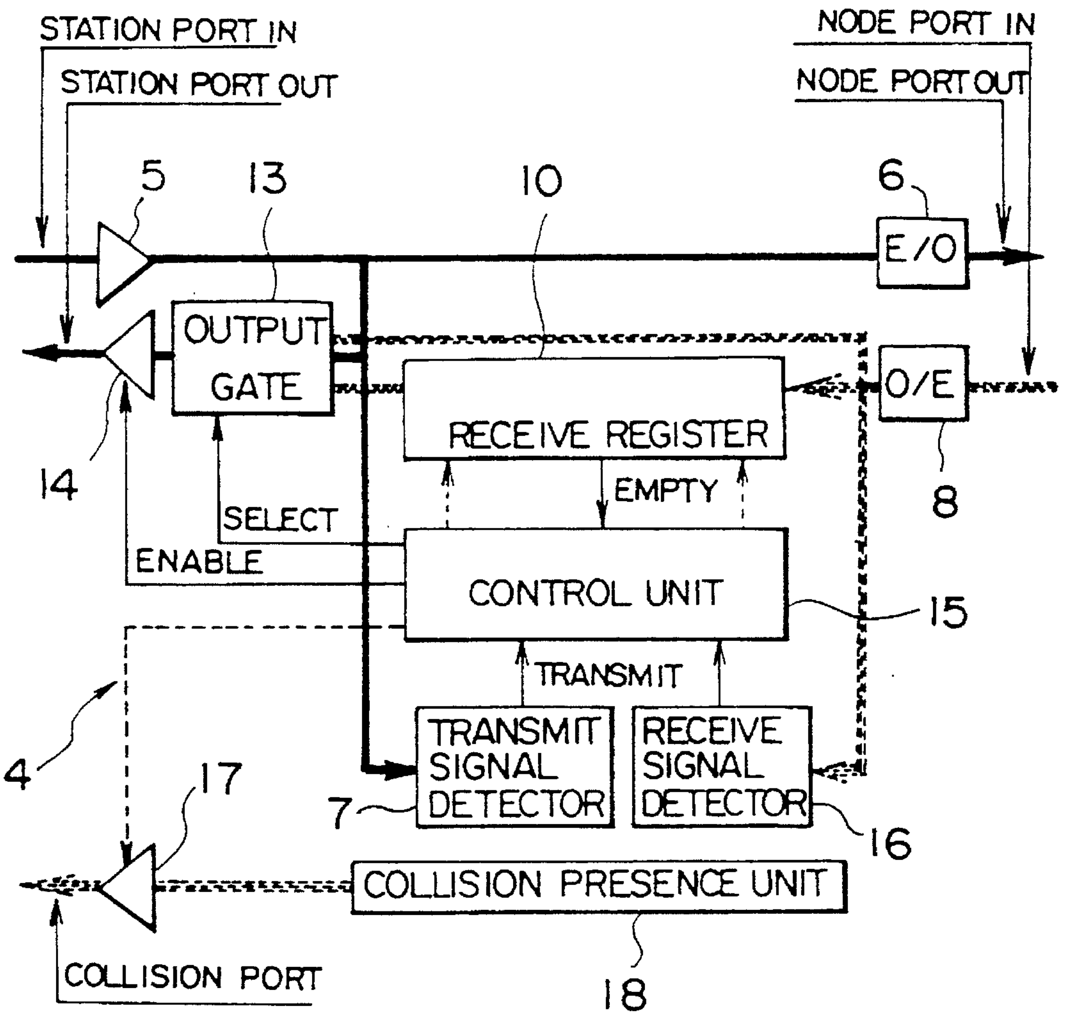
FIG. 5 is a block diagram showing a transmit process of the first embodiment of the present invention.

FIG. 5 shows the transmit operation. When a signal at the station-side input port is detected, the control unit 15 controls the output gate circuit 13, which outputs the above signal from the station-side output port to the transmit/receive station 2. The signal received at the station-side input port is transferred to the node device 1 via the E/O data link 6. When the transmit signal detector 7 detects the end of the signal received via the station-side input port, the control unit 15 is informed of the above and makes the transceiver 14 connected to the station-side output port disabled. This is an initial state.

Figure 6:
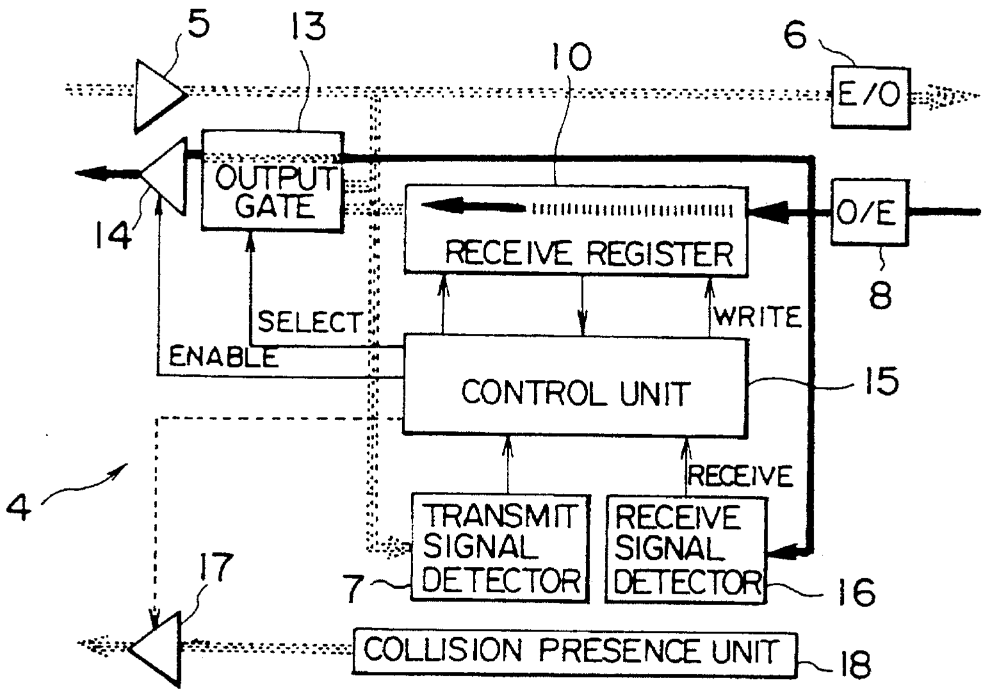
FIG. 6 is a block diagram showing a receive process of the first embodiment of the present invention.

FIG. 6 shows the receive operation. When a signal at the node-side input port is detected, 47 bits in the preamble are deleted, under the control of the control unit 15, from the signal in order to get ready for the occurrence of collisions. Then, the received signal with the 47 preamble bits deleted therefrom is written into the receive register 10, and temporarily stored therein. During the above operation, when no signal is present at the station-side input port, the control unit 15 controls the output gate 13, which allows the signal received via the node-side input port to pass to the transmit/receive station 2 side. When the receive signal detector 16 detects the end of the signal received via the node-side input port, the control unit 15 makes the transceiver 14 at the station-side output port disabled, and erases the signal in the receive register 10. This is an initial state.

Figure 7:
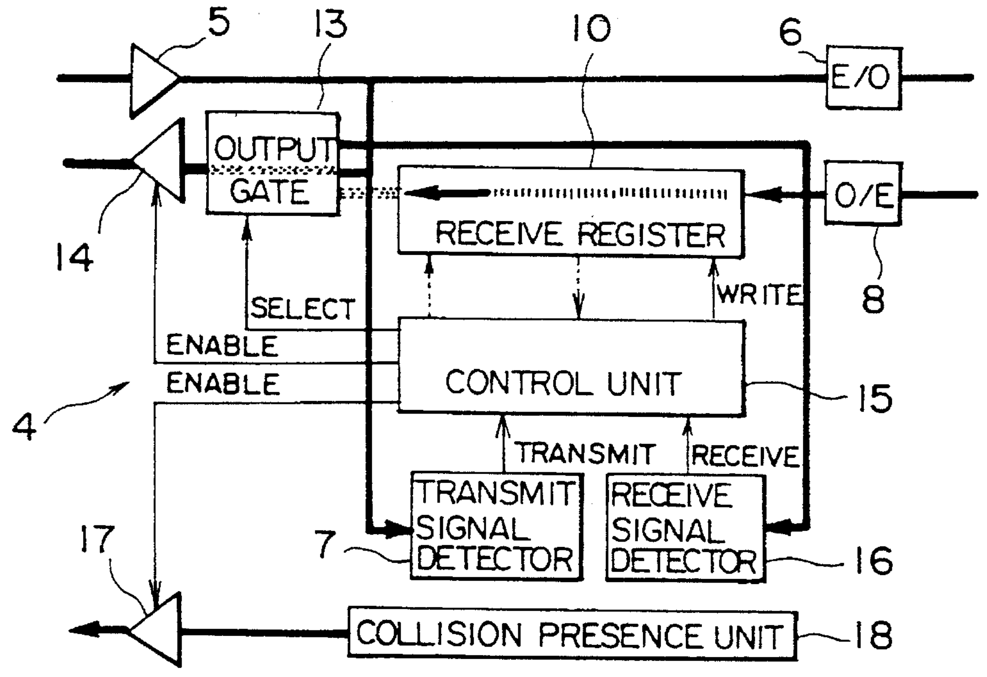
FIG. 7 is a block diagram showing a first step of a process performed when a collision occurs.

The process executed when a collision has occurred will now be described with reference to FIGS. 7 through 11. As shown in FIG. 7, signals are detected on both sides of the station-side input port and the node-side input port if a collision occurs either between the transmit/receive station 2 and the interface device 4, or between the interface unit 4 and the node device 1. When a signal at the node-side input port is detected, 47 preamble bits are deleted from the signal, and the signal with 47 bits deleted therefrom is written into the receive register 10. When a signal at the station-side input port is detected, it is output to the node device 1 via the node-side output port, and switched back to the transmit/receive station 2 via the station-side output port by controlling the output gate 13. If signals are detected at both the station-side input port and the node-side input port, the control unit 15 controls the transceiver 17 so that the collision presence signal is sent to the transmit/receive station 2 via the collision port. The transmit/receive station 2 detects the above collision presence signal, and then stops transmitting after transmitting a signal consisting of 48 bits.

Figure 8:
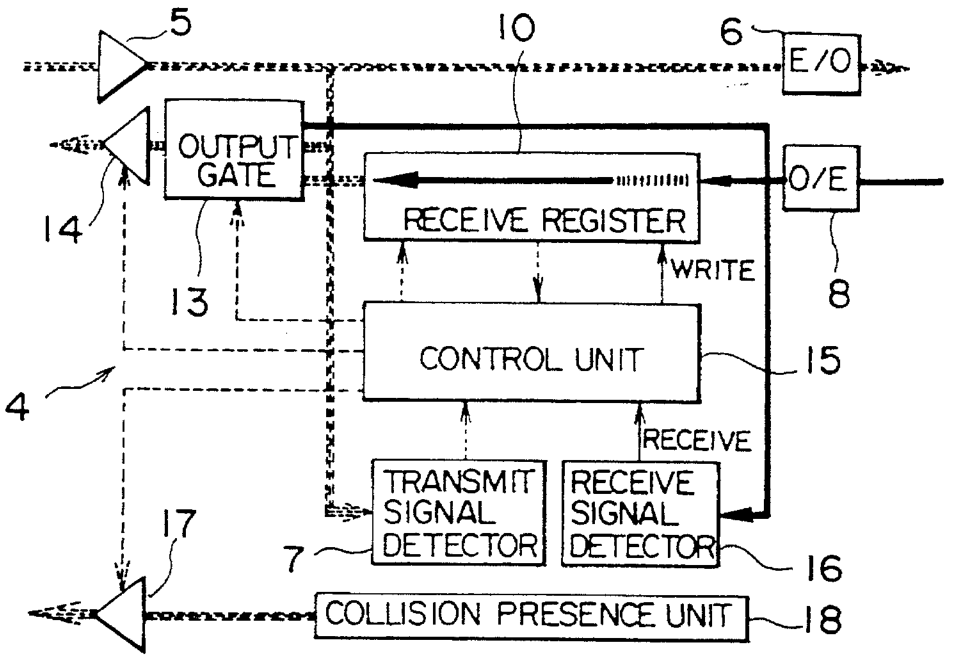
FIG. 8 is a block diagram showing a second step of the process performed when a collision occurs.
Figure 9:
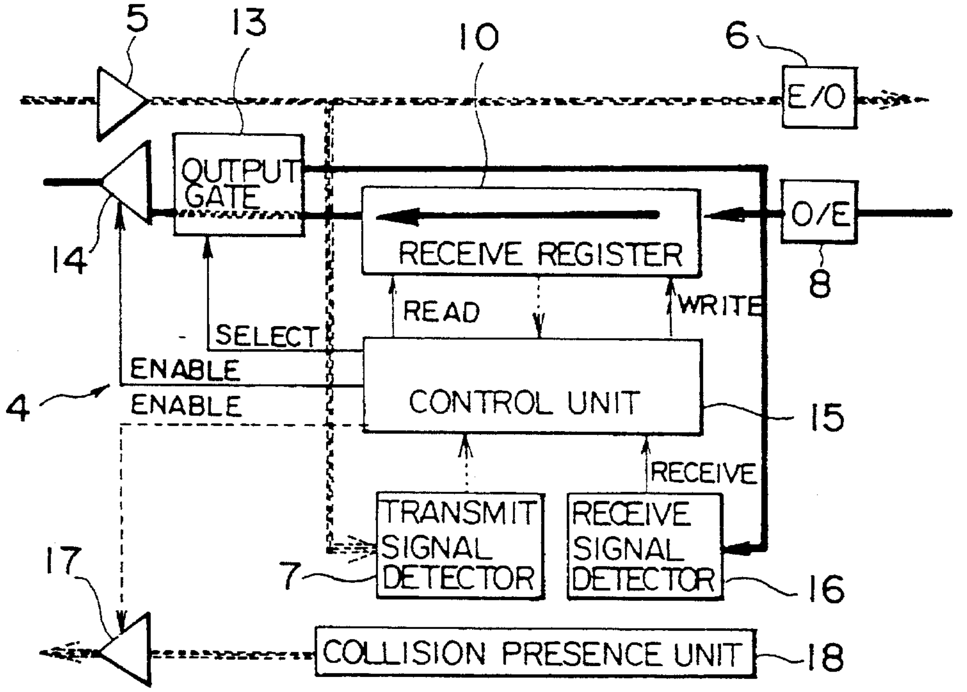
FIG. 9 is a block diagram showing a third step of the process performed when a collision occurs.
Figure 10:
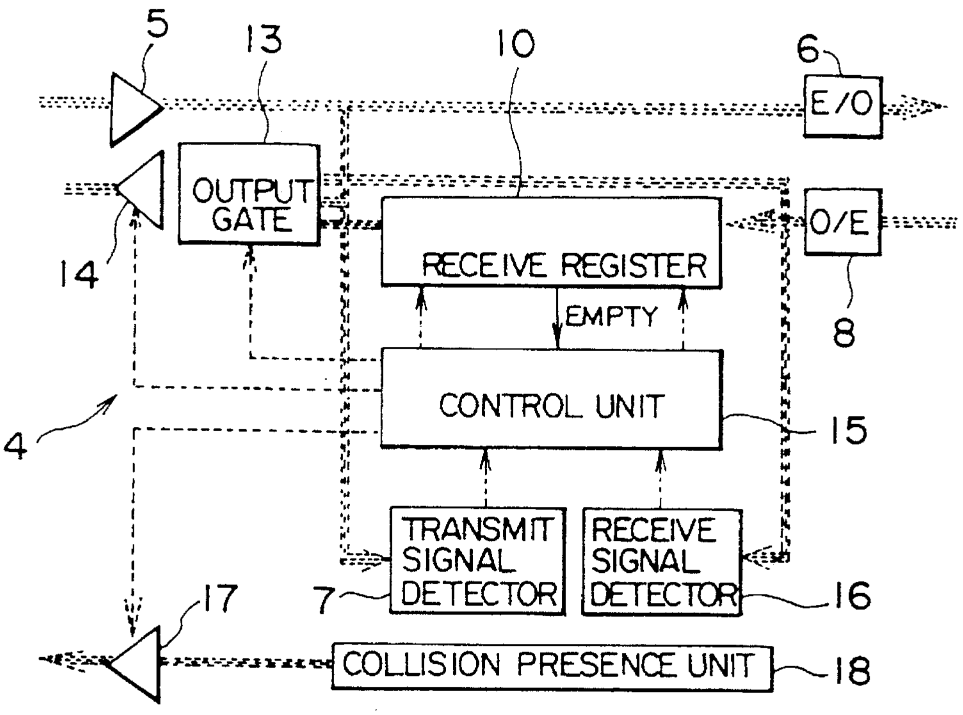
FIG. 10 is a block diagram showing a fourth step of the process performed when a collision occurs.

When the signal received at the station-side input ports ends, as shown in FIG. 8 the transceivers 14 and 17 between the station-side output port and the collision port are disabled. When 9.6 μs has elapsed from the end of the station-side input port, as shown in FIG. 9 the control unit 15 controls the output gate circuit 13 so that the signal written into the receive register 10, that is, the signal received from the node device 1, is output to the transmit/receive station 2 via the station-side output port. When it is detected that no signal has become available at the node-side input port and no signal is present in the receive register 10, as shown in FIG. 10 the control unit 15 makes the transceiver 14 at the station-side output port disabled so that the transceiver 14 returns to the initial state.

Figure 11:
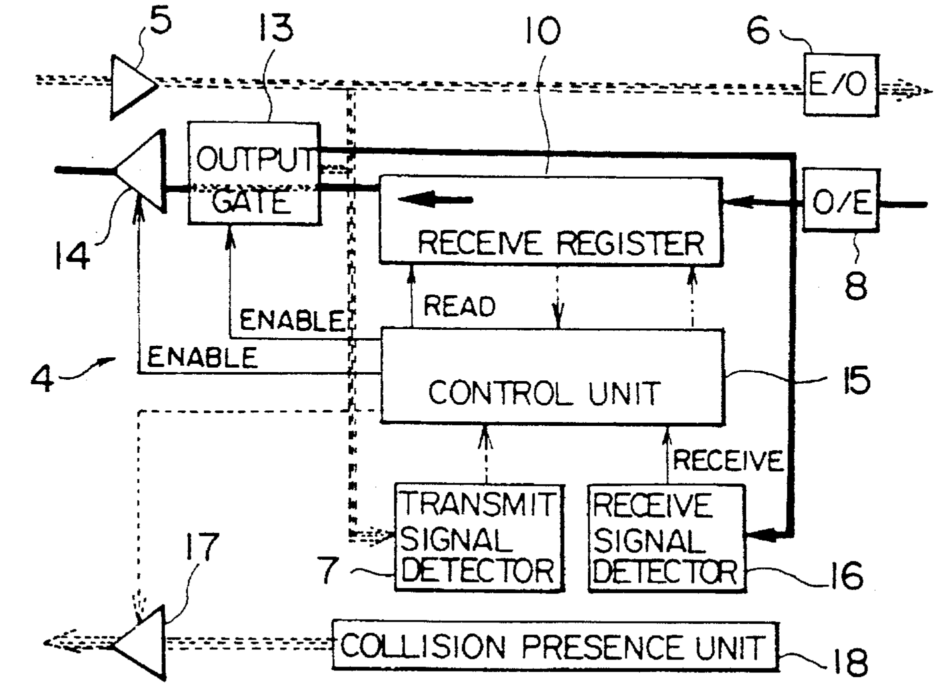
FIG. 11 is a block diagram showing a fifth step of the process performed when a collision occurs.

If a new packet has been input to the node-side input port before the outputting of the signal in the receive register 10 via the station-side output port is completed, 47 bits contained in the preamble of the above new packet are deleted therefrom. During this time, as shown in FIG. 11 the writing with respect to the receive register 10 is not carried out and all the signals previously written into the receive register 10 are output. After all the signals have been read from the receive register 10, the signal received via the node-side input port is output and the transceiver 17 returns to the initial state in the same manner as has been described with reference to FIG. 6. If new packets are successively received, two packets cannot be present in the receive register 10 at the same time because a period of at least 9.6 μs between consecutive packets is ensured.

Figure 2:
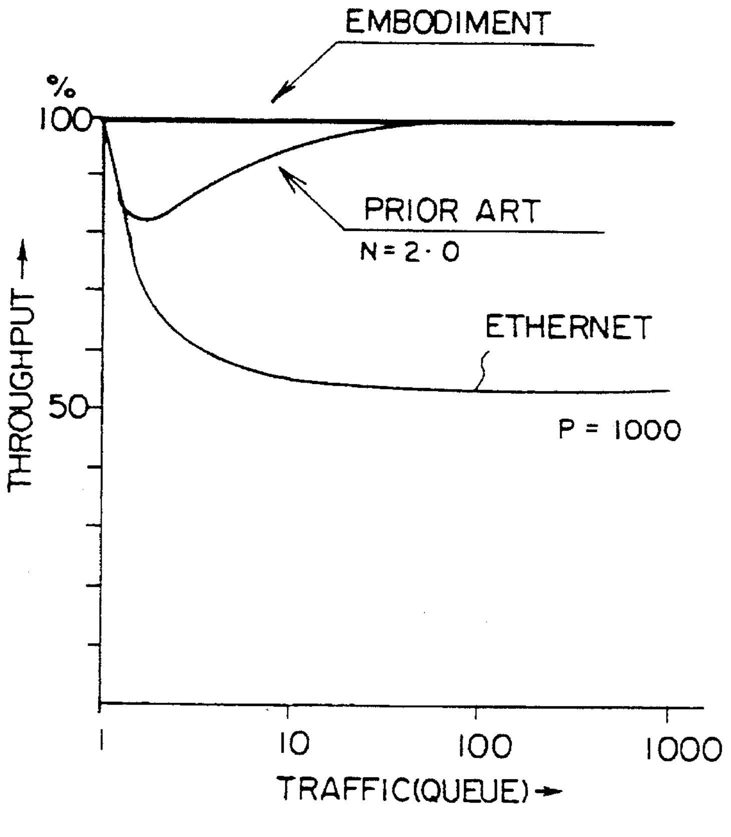
FIG. 2 is a graph showing a throughput characteristic at heavy traffic.

According to the first embodiment of the present invention, it is possible for the packet signal to be propagated through the entire network without being destroyed. As a result, ideal throughput can be obtained. The model used for describing the first embodiment of the present invention has an efficiency of 100%, as shown in FIG. 2. However, the actual throughput characteristic is estimated as shown in FIG. 1.

Figure 12:
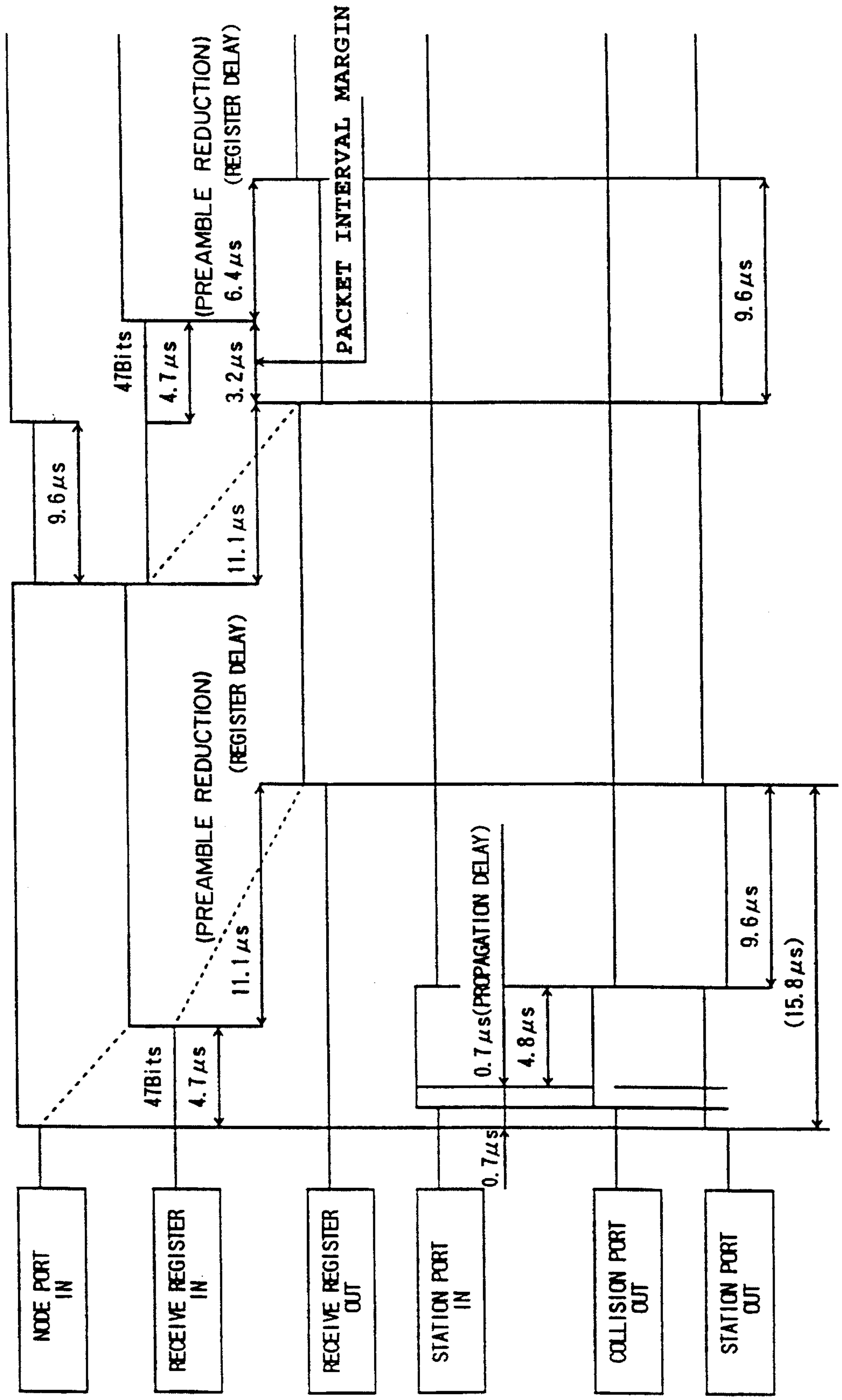
FIG. 12 is a timing chart showing the operation of a second embodiment of the present invention.
Figure 13:
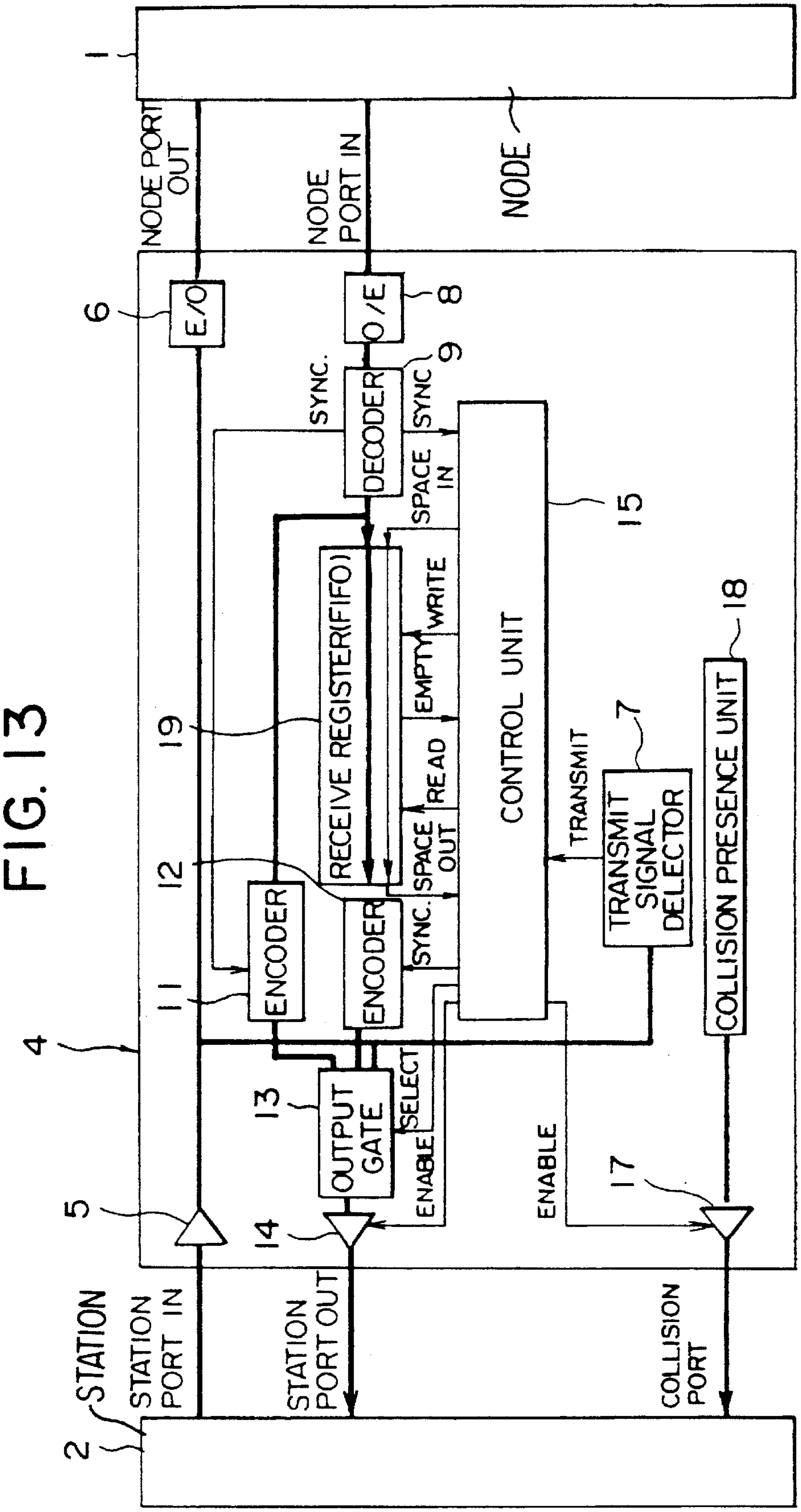
FIG. 13 is a block diagram of an interface device according to a third embodiment of the present invention.

A description will now be given, with reference to FIG. 12, of a second embodiment of the present invention. The second embodiment of the present invention is concerned with a process intended to prevent two or more packets from being present in the receive register 10 at the same time. FIG. 12 is a timing chart showing the above process. According to the Ethernet standard (the disclosure of which is hereby incorporated by reference), the length of the preamble must be equal to 17 bits. Thus, the preamble is deleted by 4.7 μs (which corresponds to 47 bits) before the signal is written into the receive register 10. It is assumed that a delay time in propagation between the transmit/receive station 2 and the interface device 4 is equal to 0.7 μs (which corresponds to a value equal to or longer than a time during which data goes and return 100 m). The jam signal output by the transmit/receive station 2 which detects a collision is equal to 4.8 μs (which corresponds to a minimum packet length of 48 bits in the Ethernet standard). When a time of 9.6 μs (which corresponds to a minimum packet interval in the Ethernet standard) has elapsed from the end of the jam signal, the interface device 4 a signal to the transmit/receive station 2. By the above setting, the next packet is allowed to be written into the receive register 10 after the current packet has been completely read therefrom. In this manner, two or more packets are prevented from being present in the receive register 10 at the same time. When a time of 9.6 μs has elapsed from the end of the signal outputting, the interface device 4 outputs the next packet to the transmit/receive station 2. Even if a plurality of packets are successively received at intervals equal to the minimum packet interval (equal to 9.6 μs), a delay due to the receive register 10 gradually decreases, and becomes zero at the fourth packet. It is possible to assign 3.2 μs, which is a packet interval margin, to another time, such as a preamble reduction time of 4.7 μs.

According to the second embodiment of the present invention, even when input signals are successively received after a collision has occurred, the receive register 10 does not overflow.

A description will now be given, with respect to FIGS. 13 through 23, of a third embodiment of the present invention. The third embodiment of the present invention is intended to use, in lieu of the receive register 10, a receive register 19 having an FIFO memory structure which handles two bits or more in parallel. The receive register 19 has a capacity equal to or greater than 158 bits. The first bit (an upper line in FIG. 13) out of the 158 bits is used for writing packet signals from the node-side input port into the receive register 19, and the second bit is used for writing space signals into the receive register 19. The receive register 19 is connected to the control unit 15. When the power supply is turned ON, and the receive register 19 becomes empty, the control unit 15 writes space signals "1" amounting to 96 bits into the second bit of the receive register 19. When the synchronizing signal from the decoder 9 is detected, the control unit 15 writes the packet signal from the decoder 9 into the first bit of the receive register 19, and writes the space signal "0" at the second bit at the same time. When the end of the packet signal from the decoder 9 is detected, the space signals "1" amounting to 96 bits are written into the receive register 19. When the control unit 15 detects a collision, the signals received via the station-side input port are switched back to the station-side output port, and the collision presence signal is output via the collision port. When it is detected that no signal has become available at the station-side input port, the control unit 15 interrupts the output gate circuit 13 during the time the space signals are "1". When the space signal becomes "0", the control unit 15 switches the output gate circuit 13 so that the packet signals stored in the first bit of the receive register 19 are output to the transmit/receive station 2 until the space signal becomes "1" again. The structure of the third embodiment of the present invention other than described above, is the same as shown in FIG. 4.

Figure 14:
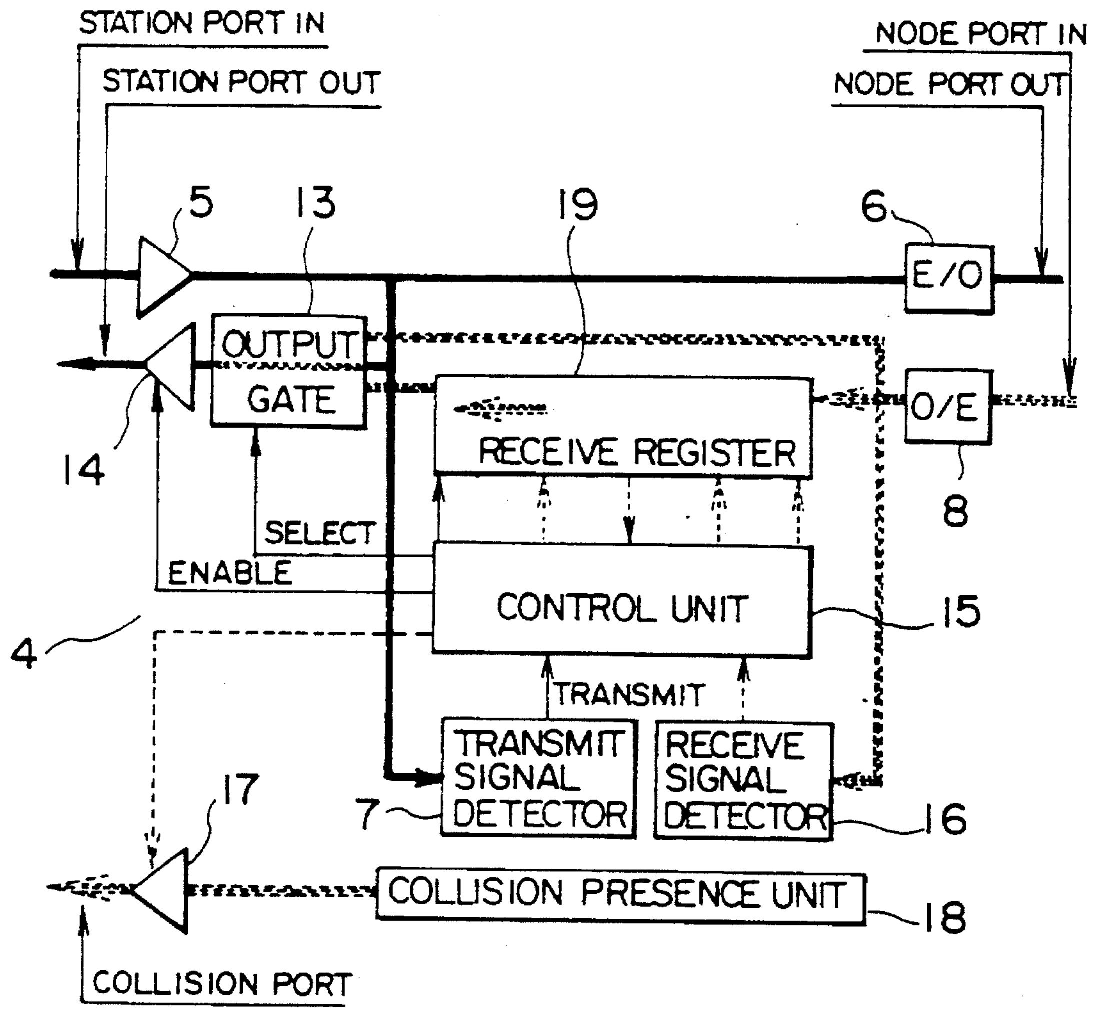
FIG. 14 is a block diagram showing a transmit process of the third embodiment of the present invention.
Figure 15:
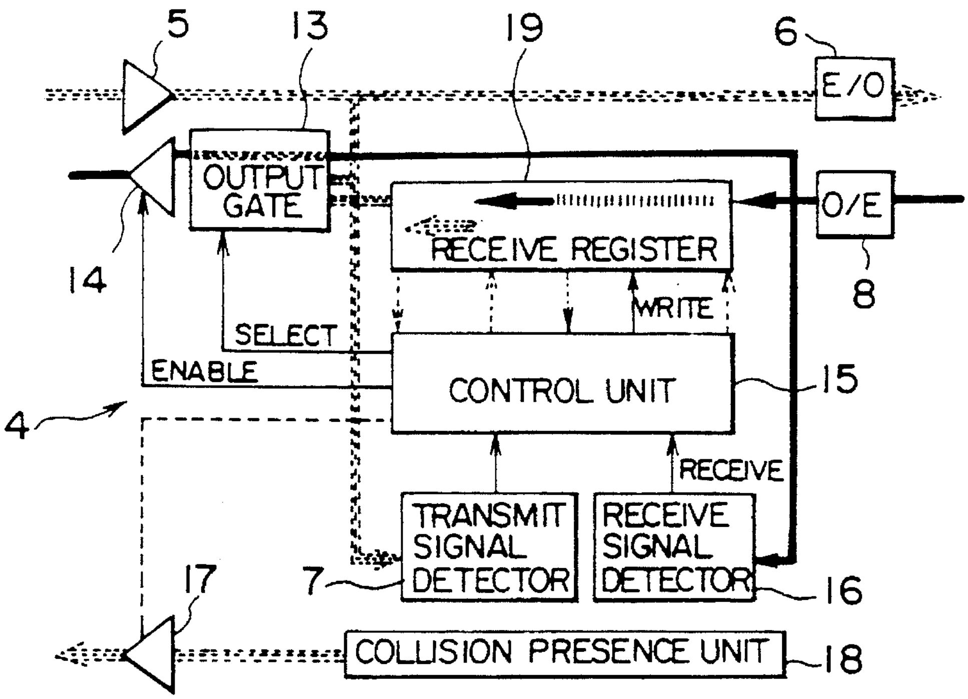
FIG. 15 is a block diagram showing a receive process of the third embodiment of the present invention.

The third embodiment of the present invention carries out the transmit and receive operations and collision processing in the following manner. FIG. 14 shows the transmit operation, which is the same as shown in FIG. 5. FIG. 15 shows the receive operation. When a signal is detected at the node-side input port, it is written into the receive register 19, into which the space signals equal to 96 bits have been written. In parallel to the above operation, the signal received at the node-side input port is output to the transmit/receive station 2 via the station-side output port by controlling the output gate 13, when it is detected that no signal has become available at the station-side input port. When it is detected that no signal has become available at the node-side input port, the control unit 15 makes the transceiver 14 at the station-side output port disabled and returns it to the initial state.

Figure 16:
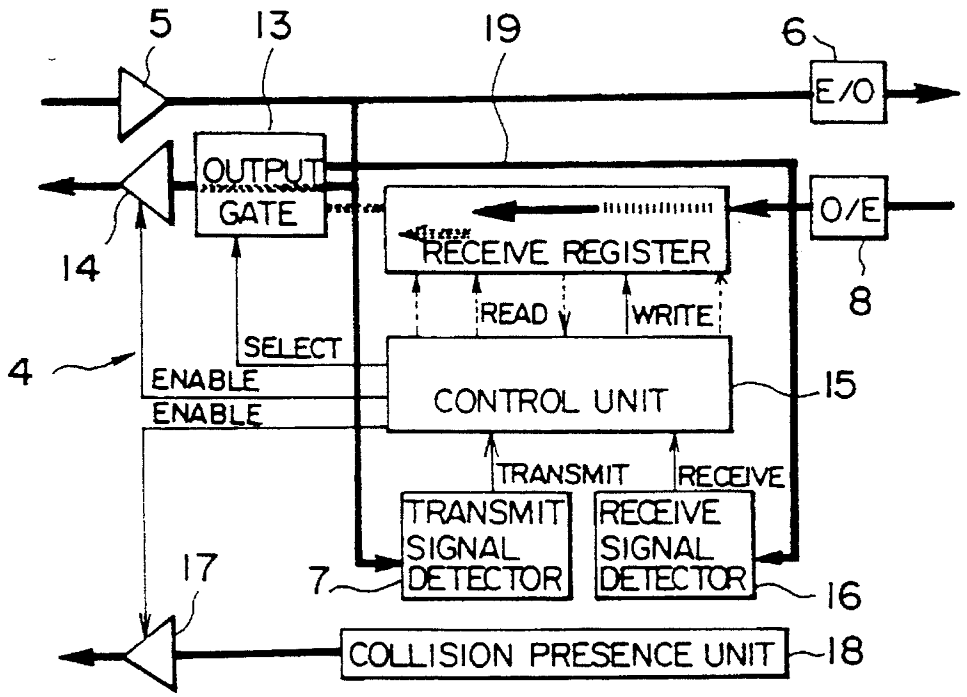
FIG. 16 is a block diagram showing a first step of a process performed when a collision occurs.

The process performed when a collision occurs will now be described. As shown in FIG. 16, if a collision has occurred in either between the transmit/receive station 2 and the interface device 4 or the interface device 4 and the node device 1, signals at both the station-side input port and the node-side input port can be detected. If a signal is detected at the node-side input port, the signal is written into the receive register 19. At this time, space signals equal to 96 bits have been written into the receive register 19. If a signal is detected at the station-side input port, the signal is output to the node device 1 via the node-side output port, and is switched back to the transmit/receive station 2 via the station-side output port by the output gate circuit 13. If signals are detected at the node-side input port and the station-side input port, the collision presence signal is output to the transmit/receive station 2 via the collision port. In response to receipt of the collision presence signal, the transmit/receive station 2 sends signals equal to 48 bits, and stops transmitting.

Figure 17:
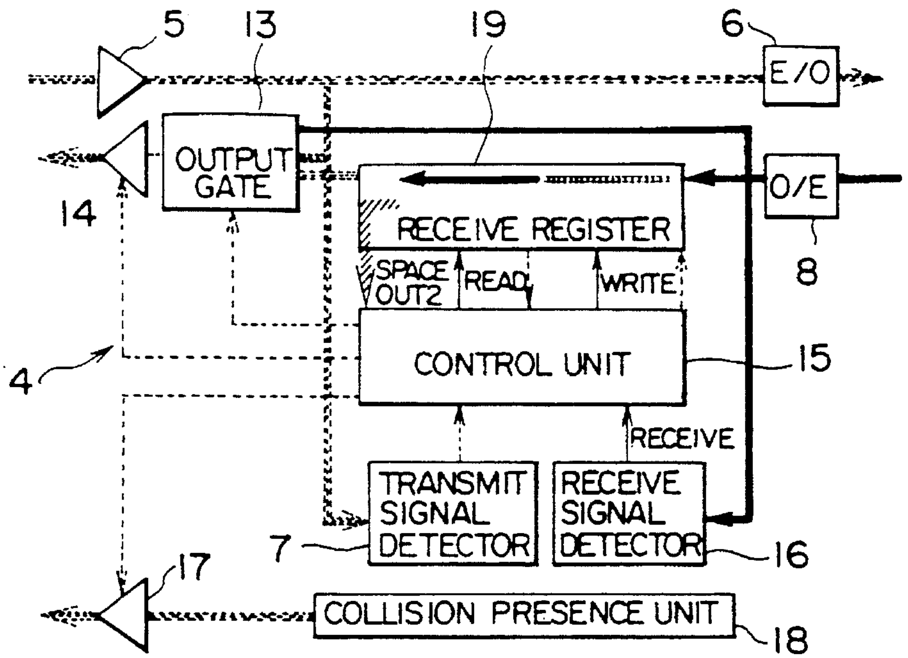
FIG. 17 is a block diagram showing a second step of the process performed when a collision occurs.
Figure 18:
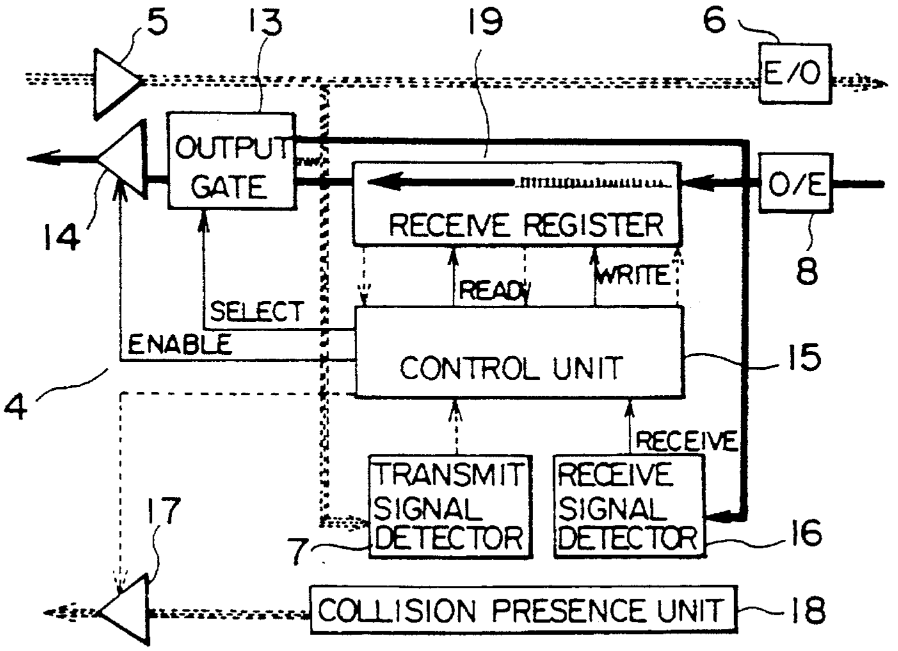
FIG. 18 is a block diagram showing a third step of the process performed when a collision occurs.
Figure 19:
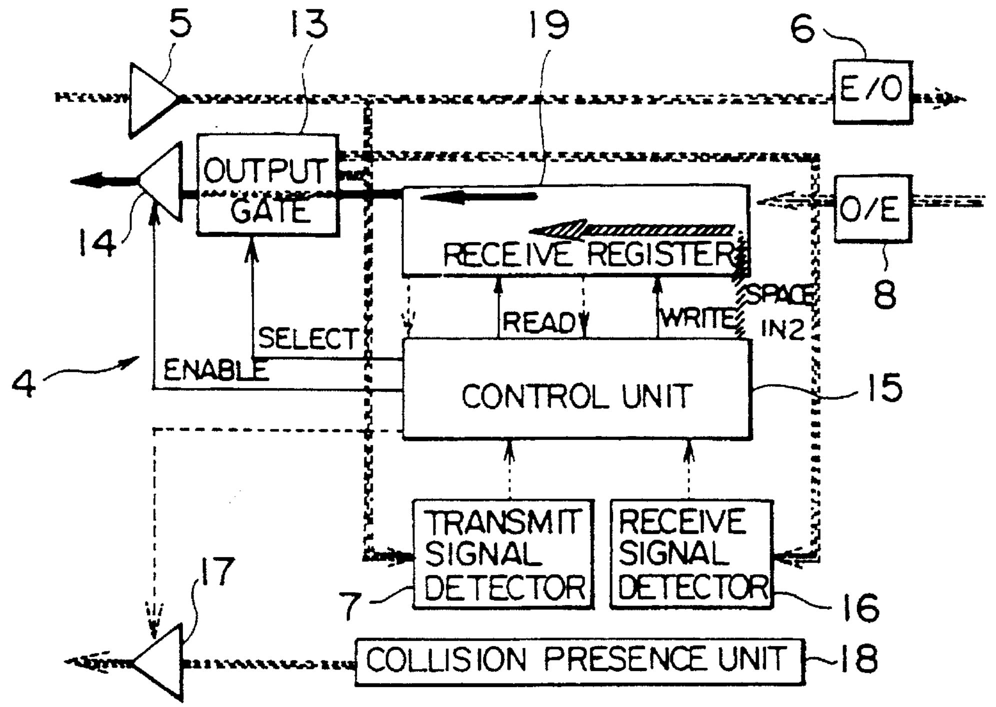
FIG. 19 is a block diagram showing a fourth step of the process performed when a collision occurs.
Figure 20:
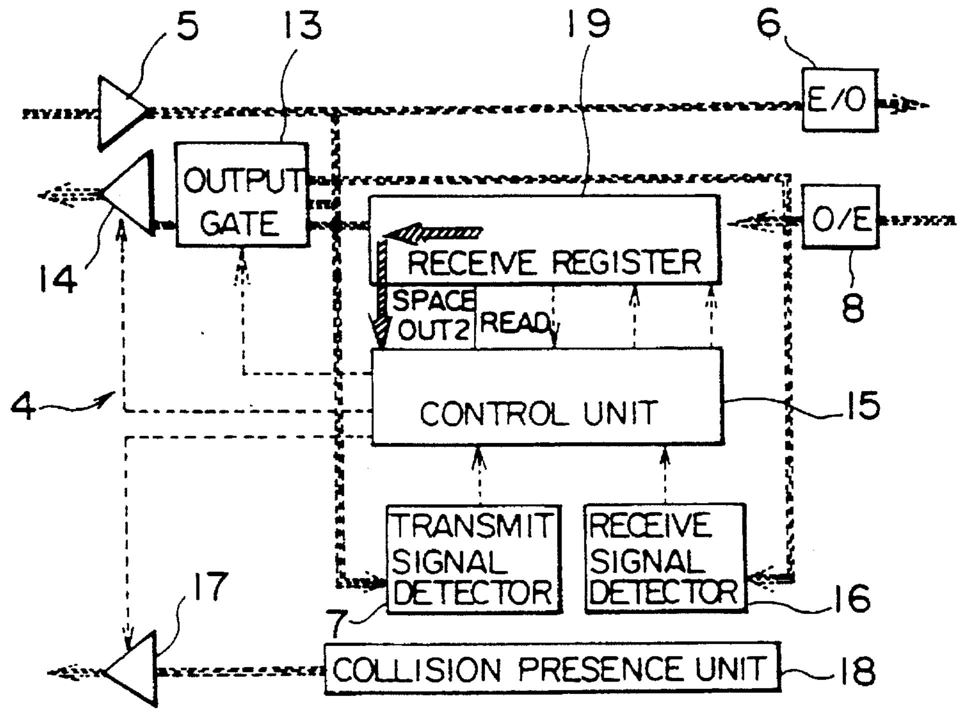
FIG. 20 is a block diagram showing a fifth step of the process performed when a collision occurs.

When it is detected that no signal has become available at the station-side input port, as shown in FIG. 17 the control unit 15 makes the transceivers 14 and 17 disabled, and reads the space signals stored in the receive register 19 therefrom. When all the space signals have been read from the receive register 19 (a time of 9.6 μs has elapsed), the control unit 15 controls the output gate circuit 13 so that the signal from the node device 1 side stored in the receive register 19 is output to the transmit/receive station 2 via the station-side output port, as shown in FIG. 18. When it is detected that no signal has become available at the node-side input port, the space signals are written into the receive register 19, as shown in FIG. 19. When no signal has become available in the receive register 19, as shown in FIG. 20 the control unit 15 makes the transceiver 14 at the station-side output port disabled and reads the space signals from the receive register 19. When there is no signal at the node-side input port while the space signals are being read from the receive register 19, the read operation is stopped and the transceiver 14 is turned to the initial state.

Figure 21:
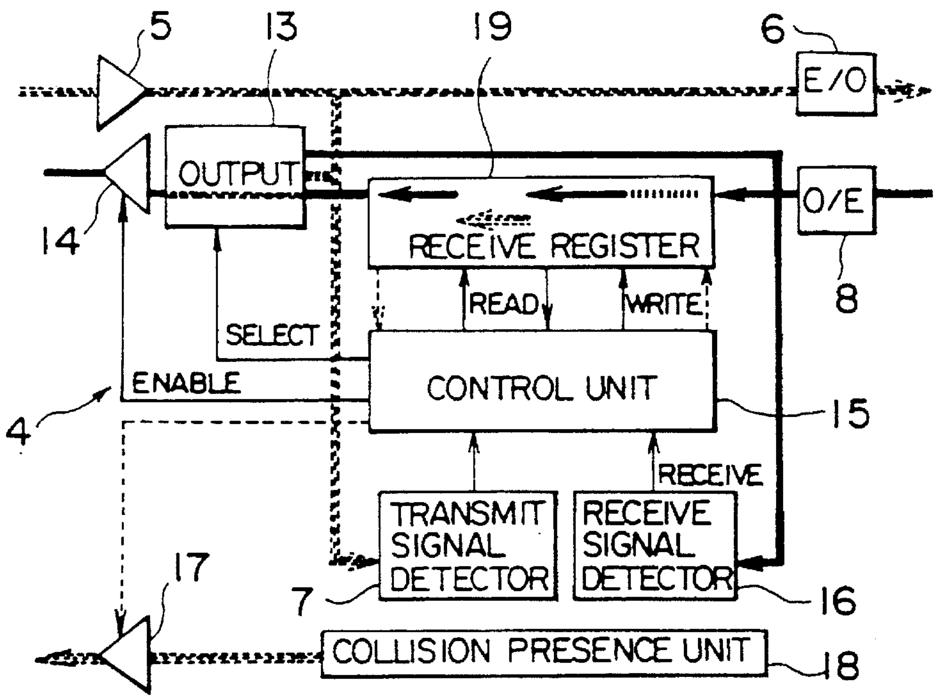
FIG. 21 is a block diagram showing a sixth step of the process performed when a collision occurs.
Figure 22:
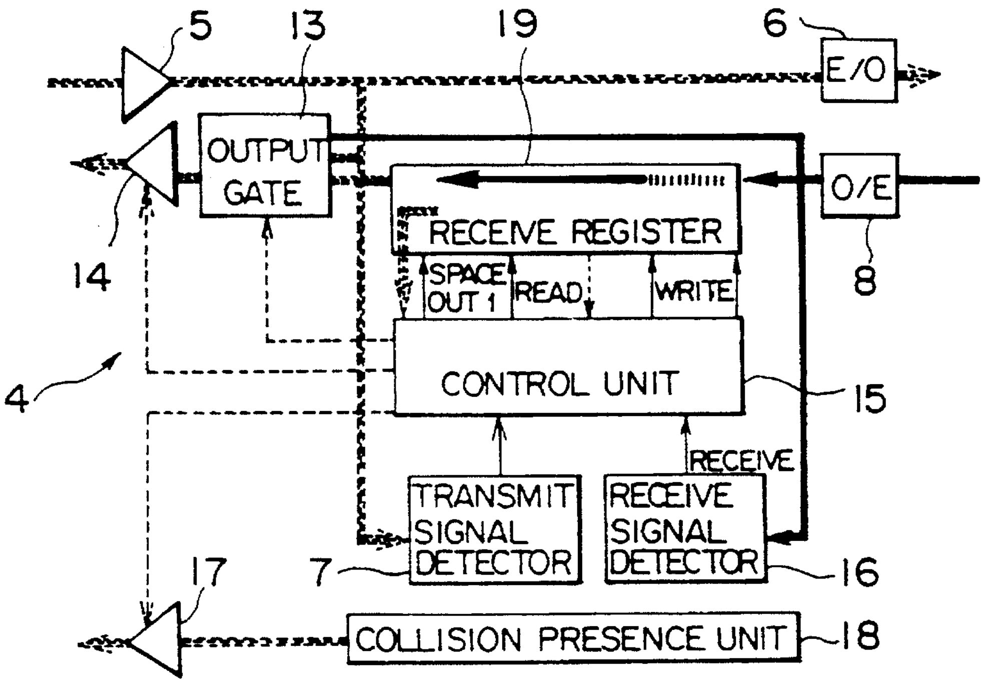
FIG. 22 is a block diagram showing a seventh step of the process performed when a collision occurs.
Figure 23:
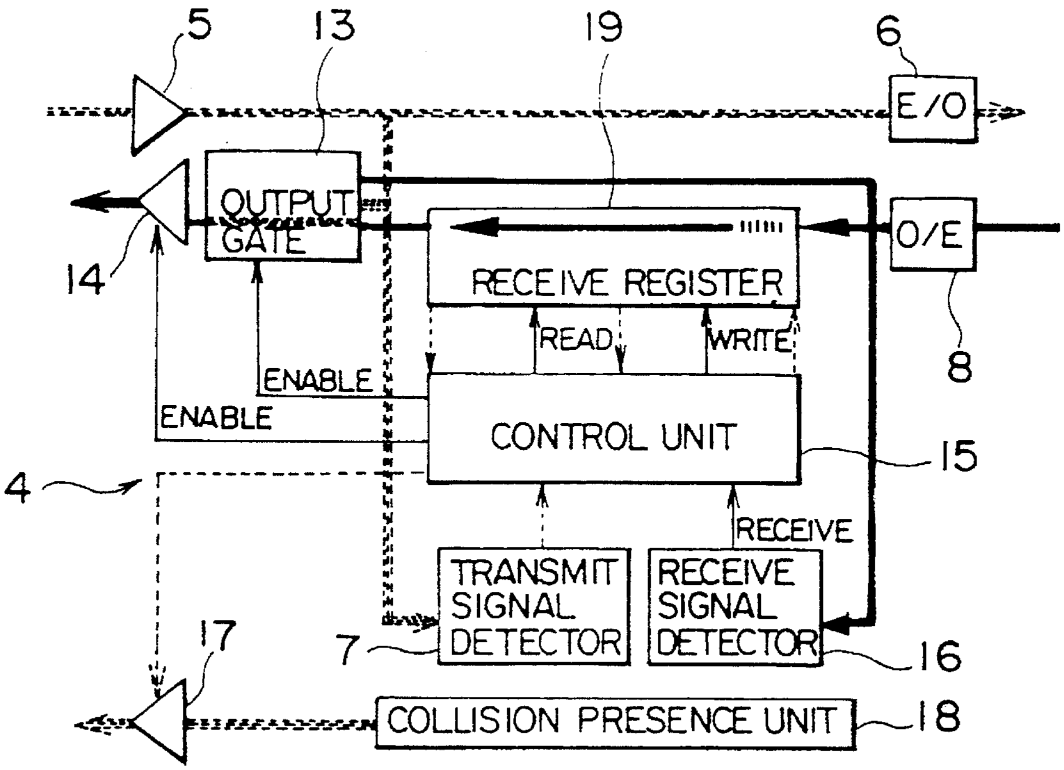
FIG. 23 is a block diagram showing an eighth step of the process performed when a collision occurs.

If a new packet is input to the node-side input port before the outputting of the signals in the receive register 19 to the station-side output port is completed, as shown in FIG. 21 the new packet is written into the receive register 19. When it is detected that no signal is present in the receive register 19, as shown in FIG. 22 the control unit 15 makes the transceiver 14 at the station-side output port disabled, and reads the space signals from the receive register 19. When it is detected that there is no space signal in the receive register 19, as shown in FIG. 23 the control unit 15 controls the output gate circuit 13 so that the signals in the receive register 19 are read therefrom and output to the transmit/receiver station 2 side. This processing step corresponds to that shown in FIG. 18, and the subsequent steps are carried out in the same manner as has been described with reference to FIG. 18. If new packets are successively input, the state as has been described with reference to FIG. 22 is obtained because an interval of 9.6 μs between adjacent packets is ensured.

According to the third embodiment of the present invention, it is not necessary to delete the preamble of each packet signal, and the receive register 19 does not overflow. Hence, the third embodiment of the present invention is totally compatible with the IEEE 802.3 10 BASE5 standard.

Figure 24:
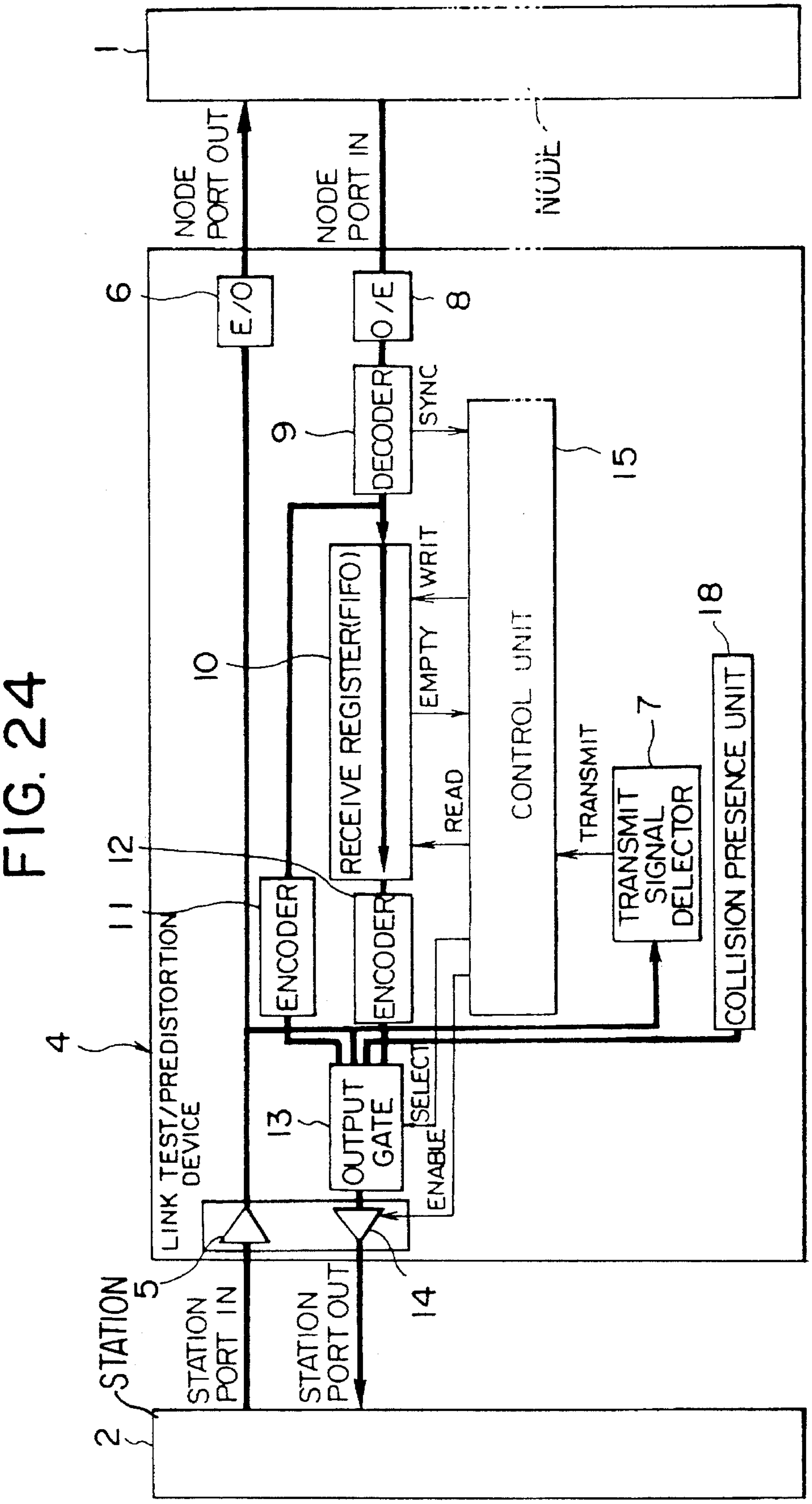
FIG. 24 is a block diagram showing a fourth embodiment of the present invention.

A description will now be given of a fourth embodiment of the present invention with reference to FIG. 24. In the fourth embodiment of the present invention, each interface device 4 does not have the collision port, and the collision presence unit 18 is connected to the output gate circuit 13. Under the control of the output gate circuit 13, the collision presence signal is output to the transmit/receive station 2 side via the station-side output port. The fourth embodiment of the present invention thus configured is totally compatible with the IEEE 802.3 10 BASE T standard.

Figure 25:
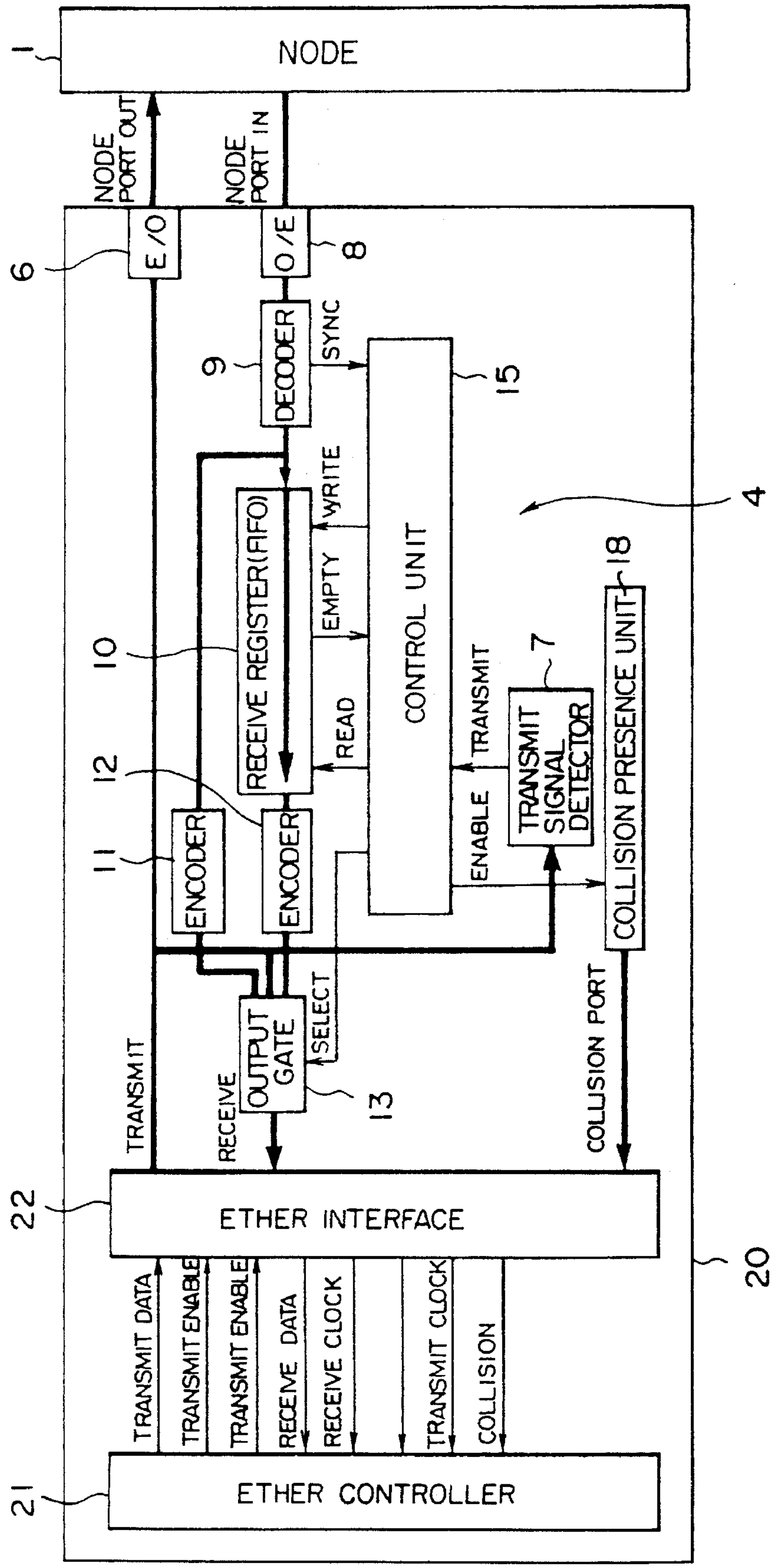
FIG. 25 is a block diagram showing a fifth embodiment of the present invention.

A description will now be given, with respect to FIG. 25, of a fifth embodiment of the present invention, in which the interface device 4 is installed in a network interface unit (NIU) 20 provided in the transmit/receive station. It is noted that the interface device 4 shown in FIG. 25 is the same as that shown in FIG. 7. The network interface unit 20 is mainly controlled by an Ether controller 21. An Ether interface 22 is provided between the Ether controller 21 and the interface device 4. That is, by combining the interface device 4 of the present invention with an LSI for the Ethernet, a unique network interface unit specifically used for the present invention is provided. Such a network interface unit is small in size and low in cost.

A description will now be given, with reference to FIGS. 26 through 42, of a sixth embodiment of the present invention, which is intended to improve the above-mentioned embodiments of the present invention. Before the sixth embodiment of the present invention is described in detail, a description will be given of problems to be solved by the sixth embodiment of the present invention. In the first to fifth embodiments of the present invention, a maximum network length, which is the length between the highest-order node device and the lowest-order node device, is limited to being equal to a 31-bit time (approximately equal to 600 m). This is because each node device interrupts the outputting of signals oriented to the low-order ports within the preambles thereof, and the signal output interruption is limited to being 31 bits which are half the preamble length equal to 62 bits. The above length is insufficient taking into account a maximum network length prescribed in the Late Collision Error of the Ethernet protocol, which is equal to a 256-bit time (which corresponds to about 5 km).

Further, a synchronous error will occur when the output signals to the low-order direction ports are switched. Such a synchronous error is negligible in practical use, but is not ensured as the IEEE 802.3 standard. Furthermore, the above-mentioned structure is a structure of an interface device for use in station connection, and is not suitable for connection with stations conforming to the IEEE 802.3 10 BASE T standard. That is, the above structure is compatible with the IEEE 802.3 10 BASE T standard is ensured, but is lack of compatibility with the IEEE 802.3 BASE T standard.

The principle of the Ethernet concentrator according to the sixth embodiment of the present invention (which is identified by EC2 in order to distinguish the prior Ethernet concentrator EC) will now be described. The topology of the EC2 is, as shown in FIG. 27, a tree-like hierarchical structure identical to that prescribed in the IEEE 802.3 10 BASE T standard as shown in FIG. 27. Each node in the tree is called "Hub" in the IEEE 802.3 BASE T standard, while it is called "node device" in the EC2. A node device 31 is based on, for example, CN240, and has one high-order direction port Pu and a plurality of low-order direction ports Pd. Another node device 31 is connected to the high-order direction port Pu, and other node devices 31 or transmit/receive stations 32 are connected to the low-order direction ports Pd. Hence, each node device 31 is categorized into a station-connected node device 31*a* to which the transmit/receive stations 32 are connected via the low-order direction ports Pd thereof or a node-connected node device 31*b* to which other node devices 31 are connected via the low-order direction ports Pd.

The maximum network length L of the EC2 has a limit inherent in the EC2, and is equal to half the time prescribed by the late collision error of the normal Ethernet protocol, that is, a 256-bit time (which corresponds to approximately 5 km).

The algorithm of the node device 31 of the EC2 will now be described. The operational principle of the EC2 consists of three algorithms. The first algorithm is a routing algorithm, which will now be described with reference to FIGS. 28A through 28C. In these figures, a thick arrow having hatching denotes the preamble, a thick arrow with dots added thereto denotes a state in which there is no signal, and a thick arrow filled with black denotes a state in which the original data signal is being input or output. The node 31 has a port 0, which is the high-order direction port Pu, and ports 1 and 2, which are the low-order direction ports Pd. If signals arrive at both the ports 1 and 2, as shown in FIG. 28A the port 1 is selected by the first arrival logic regarding the low-order direction ports 1 and 2. If signals arrive at the high-order direction port and one of the low-order direction ports, as shown in FIG. 28B the port 1, which has priority over the low-order direction ports, is selected. In this manner, one of packets transmitted by the transmit/receive stations 32 is allowed to arrive at the highest-order node device 31, and is propagated therefrom through the network, as shown in FIG. 28C.

Figure 29A:
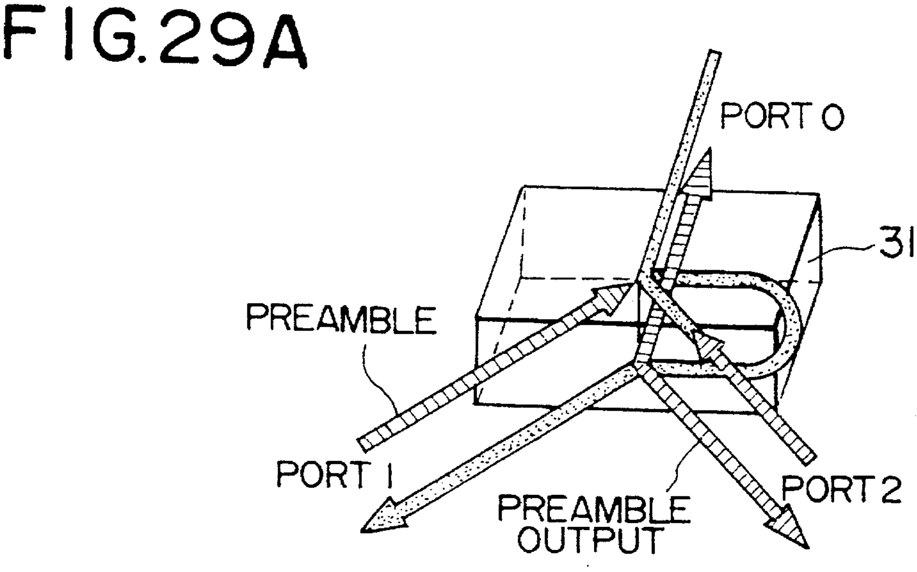
FIGS. 29A, 29B and 29C are diagrams showing a collision algorithm.
Figure 29B:
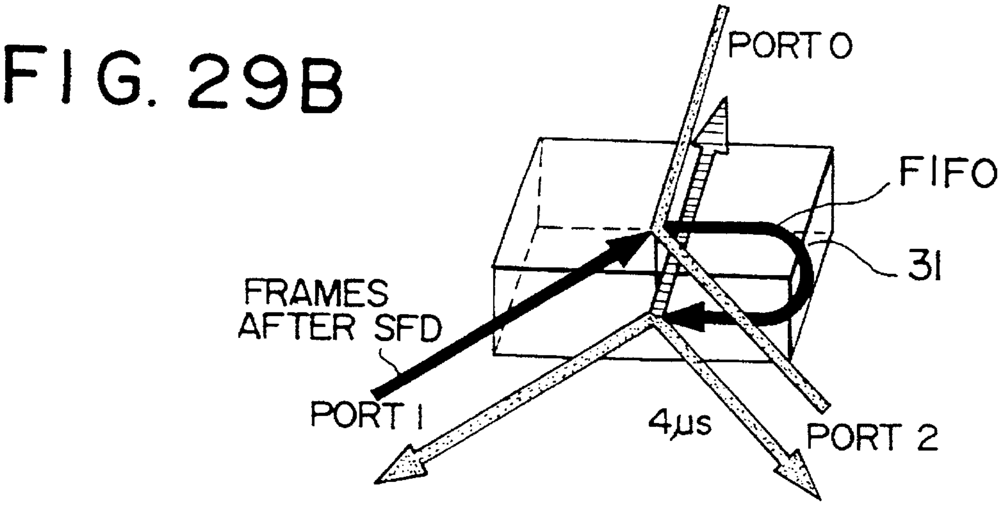
Figure 29C:
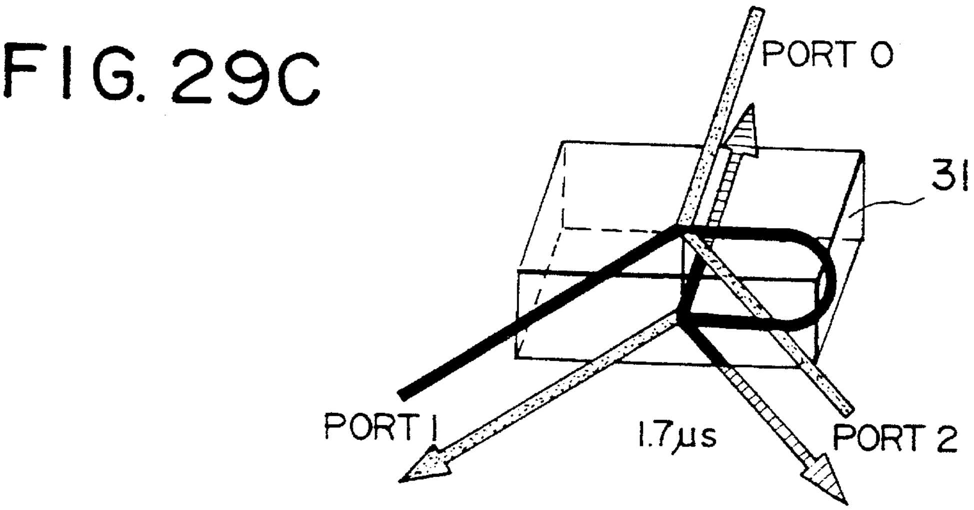

The second algorithm is a collision algorithm, which will now be described with reference to FIGS. 29A through 29C. The second algorithm is intended to make it for the transmit/receive station 32 to receive a packet in the following manner. A collision between the node device 31 and the transmit/receive station 32 is detected, as shown in FIG. 29A. As shown in FIG. 29B, a packet which is the first-arrival input port 1 (or the high-order direction port 0) is temporarily stored in the FIFO memory built in the node device 31 and hence a minimum packet interval of 4 μs is ensured. As shown in FIG. 29C, a preamble having a minimum length of 1.7 μs is added to the packet, and the packet with the preamble added thereto is output. The detection of collisions in the transmit/receive station 32 is carried out in such a manner that communication is successful if a carrier is not received at the time of receiving and a retransmission is requested if the carrier is received. The above procedure for collision detection is the same as that prescribed in the IEEE 802.3 10 BASE T standard.

Figure 30A:
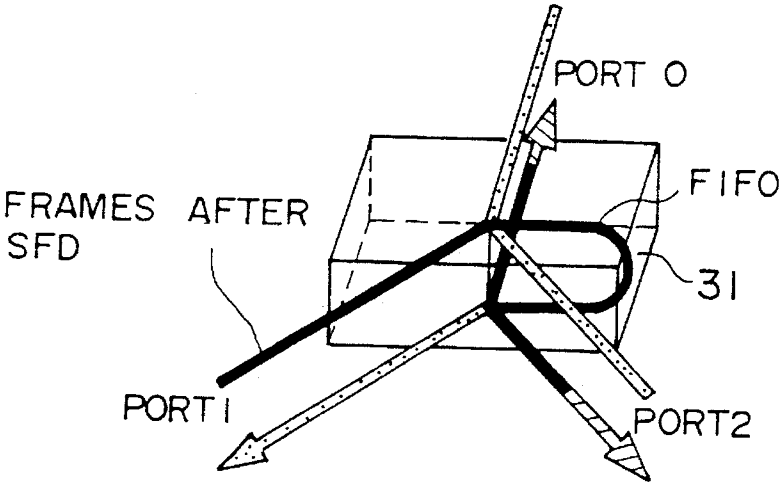
FIGS. 30A, 30B and 30C are diagrams showing and SFD algorithm.
Figure 30B:
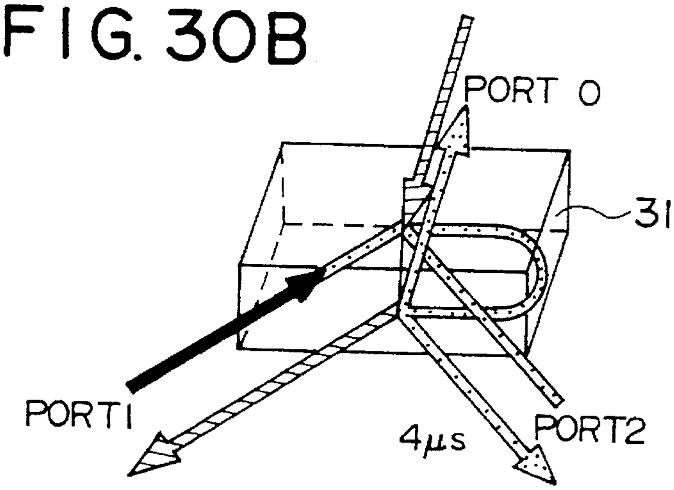
Figure 30C:
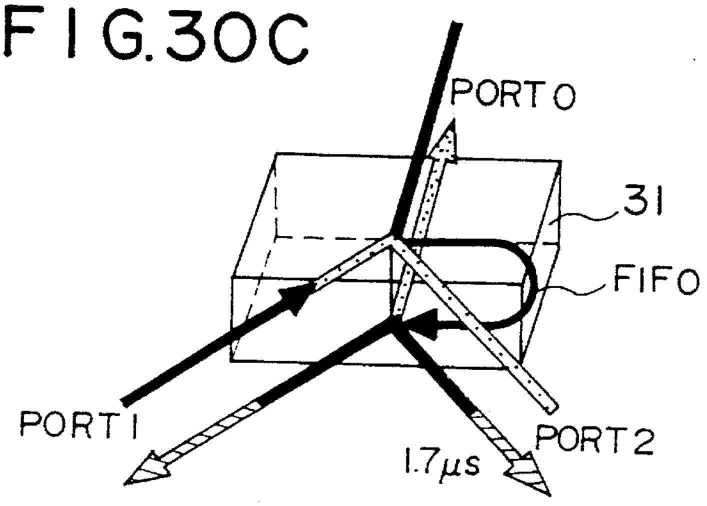

The third algorithm is an SFD (Start Frame Delimiter) algorithm, which will now be described with reference to FIGS. 30A through 30C. According to the priority order in which the high-order direction port 0 has priority over the other ports, a packet switching from the first-arrival input port 1 to the high-order direction port 0 is carried out. If the above packet switching is carried out after the SFD passes through the node 31, two packets (the first packet is interrupted) cannot be discriminated from each other, and hence an error takes place. The SFD indicates a leading portion of the frame subsequent to its preamble, as will be described in detail later. According to the SFD algorithm of the EC2, when the packet switching is carried out after the SFD has been output, the packet at the high-order direction port 0 is temporarily stored in the FIFO memory to thereby ensure the minimum packet interval (4 μs) (see FIG. 30B), and the preamble having the minimum length (1.7 μs) is added to the packet in the FIFO memory (see FIG. 30C). In this manner, it becomes possible to discriminate two packets from each other.

Figure 31A:
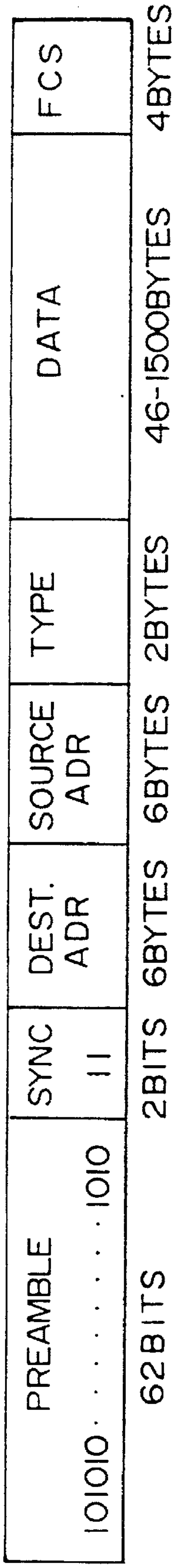
FIGS. 31A and 31B are diagrams showing formats of the Ethernet and the IEEE 802.3 packet, respectively.
Figure 31B:
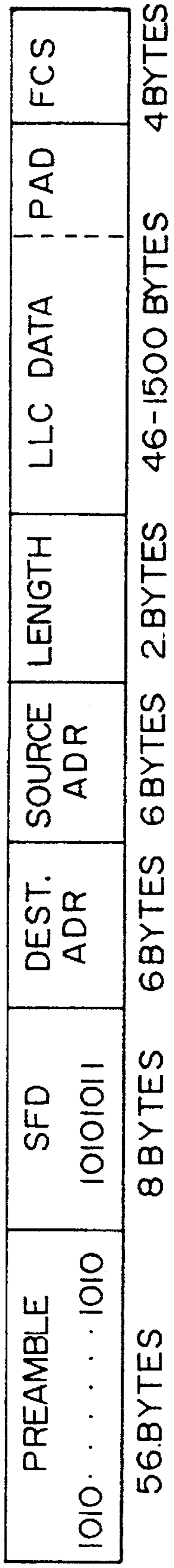

The EC2 is limited regarding the following time constant based on the Ethernet protocol in order to establish the compatibility with the Ethernet protocol. First, the minimum preamble length is set equal to 1.7 μs. FIG. 31A shows the packet format of the Ethernet, and FIG. 31B shows the packet format of the IEEE 802.3 standard. There are two regulations of the minimum preamble length. The minimum preamble length with respect to the transmit station is a 62-bit time shown in FIG. 31A, and the minimum preamble length with respect to the receive station is a 17-bit time. These lengths are prescribed taking into account loss during propagation. Hence, the minimum preamble length equal to the 17-bit time must be ensured in the device 31 of the EC2.

Secondary, the maximum jam signal length is set equal to 4.8 μs. When the transmit station detects a collision, it outputs the jam signal which makes it possible for the other stations to detect collisions. The maximum jam signal length of a signal consisting of the jam signal and the packet which has been transmitted is prescribed so that it is equal to a time of between a 36-bit time and a 48-bit time. Thirdly, the minimum packet interval is set equal to 4 μs. There are also two regulations of the minimum packet interval. The minimum packet interval with respect to the transmit station is equal to 9.6 μs, and the minimum packet interval with respect to the receive station is equal to 4 μs. Hence, it is necessary for the node device 31 of the EC2 to ensure the latter minimum packet interval equal to 4 μs. The fourth requirement is that the late collision is set equal to 51.2 μs. The late collision is an error in the case in which a collision is detected after a 512-bit time (=51.2 μs) elapses from the time when the transmit station starts to transmit signals. The maximum network length L of the EC2 is limited by the above late collision.

The fifth requirement is concerned with storage of packets in the collision algorithm. The node device 31 stores frames after the SFD of the packet when a collision occurs, and outputs the packet with the minimum length preamble added thereto after the minimum packet interval elapses from the time when the jam signal from the transmit/receive station 32 ends. Assuming that the delay time in propagation between the node device 31 and the transmit/receive station 32 is 1 μs, the jam signal ends with the latest delay when the transmit/receive starts to transmit data and receive data at the same time. The maximum packet storage time obtained at that time is obtained as follows:

Maximum packet storage time=(delay in going and returning propagation between the node device 31 and the transmit/receive station 32)+(maximum jam signal length)+(minimum packet interval)−{(preamble length of the original packet)−(minimum preamble length)}=1+4.8+1+4−(6.2−1.7)=6.3 μs.

A minimum input packet valid interval (the length between the trailing end of the preceding packet and the SFD of the subsequent packet) is obtained as follows:

Minimum input packet valid interval=(original minimum packet interval)+(preamble length of the original packet)=9.6+6.2=15.8 μs.

Thus, a margin time necessary to prevent interference between two packets is obtained as follows:

Margin time=(minimum input packet valid interval)−(maximum packet storage time)−(minimum packet interval)−(minimum preamble length)=15.8−6.3−4.1−1.7=3.8 μs.

It can be seen from the above that the algorithm of the EC2 is capable of coping with consecutive packets.

The sixth requirement is concerned with the time constant regarding the packet storage. When a packet arrives at the high-order direction port after the SFD of a packet at the low-order direction port is output, the node device 31 temporarily interrupts the outputting of the packet to the low-order direction port, and outputs it with the minimum preamble thereto to the low-order direction port after the minimum packet interval has elapsed. That is, Maximum packet storage time=minimum packet interval=4 μs, and Minimum input packet valid interval=(original minimum packet interval)+(preamble length of the original packet)=9.6+6.2=15.8 μs.

Thus, the margin time necessary to prevent interference between two packets is obtained as follows:

Margin time=(minimum input packet valid interval)−(maximum packet storage time)−(minimum packet interval)−(minimum preamble length)=15.8−4−4−1.7=6.1 μs.

It can be seen from the above that the algorithm of the EC2 can cope with consecutive packets.

A description will be given of the network algorithm of the EC2. FIGS. 32 through 37 show how packets are propagated through the network of the EC2 while the node device 31 is operating according to the above-mentioned node algorithm of the EC2. In the following description, [1] is concerned with the operation of the transmit/receive station 32, [2] is concerned with the operation of the station-connected node device 31*a*, and [3] is concerned with the operation common to the station-connected node device 31*a* and the node-connected node device 31*b*.

Figure 32:
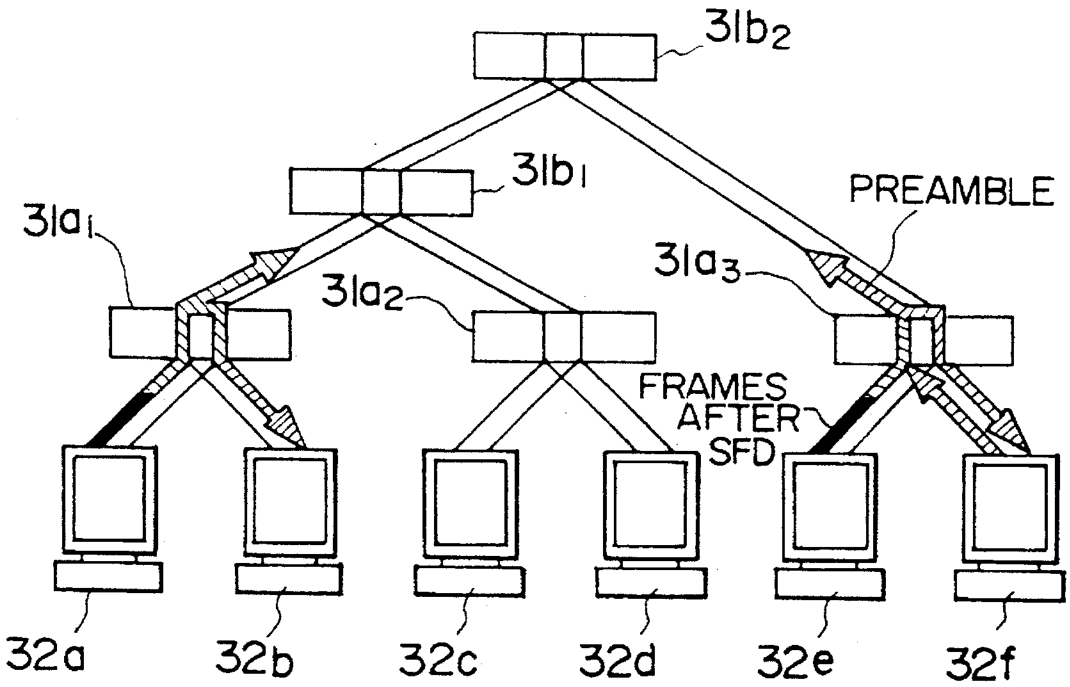
FIG. 32 is a block diagram showing a first step of an algorithm of the EC2 network.

The first step of the network algorithm will now be described with reference to FIG. 32.

[1] Each transmit/receive station confirms that there is no carrier, and then sends a packet. In FIG. 32, the transmit/receive station 32*a*, 32*b* and 32*e* are operating in the above manner.

[3] When packets are input to the low-order direction ports of the node devices, the node devices output the packets via the high-order direction ports and the other low-order direction ports. In FIG. 32, the node devices $\mathbf{31}a_1$ and $\mathbf{31}a_3$ are operating in the above manner. If packets are concurrently input to a plurality of low-order direction ports, like the node device $\mathbf{31}a_3$, the first-arrival port is selected.

[2] The transmit station detects a collision by carrier detection during transmitting, and stops transmitting after outputting the jam signal. In FIG. 32, the transmit/receive station 32*f* is operating in the above manner.

Figure 33:
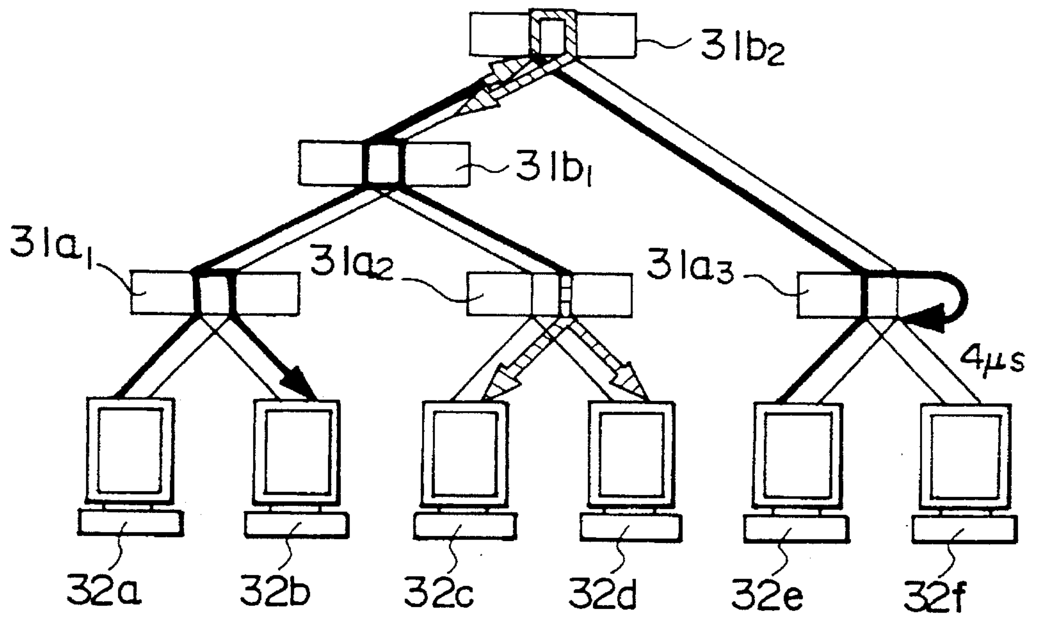
FIG. 33 is a block diagram showing a second step of the algorithm of the EC2 network.

The second step of the network algorithm will now be described with reference to FIG. 33.

[3] When each node device detects the SFD of the input packet, it stores data indicating the detection of the SFD. In FIG. 33, the node devices $\mathbf{31}a_1$, $\mathbf{31}a_3$ and $\mathbf{31}b_1$ are operating in the above manner.

[2] When each node device detects the end of the jam signal from the transmit/receive station, it stops to output input packets from the low-order direction ports during the minimum packet interval (4 μs), and stores frames of the packet received at the first-arrival input port after the SFD. In FIG. 33, the node device $\mathbf{31}a_3$ is operating in the above manner.

[1] The transmit/receive station which detects a collision, is initialized during that time, and becomes capable of receiving a new packet. In FIG. 33, the transmit/receive station 32*f* is operating in this manner.

Figure 34:
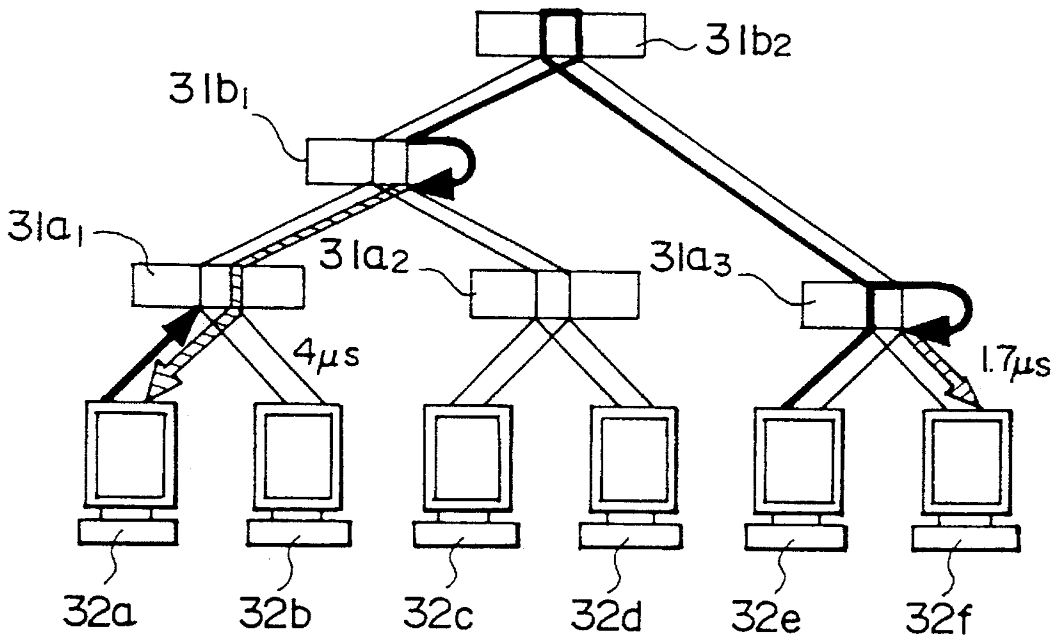
FIG. 34 is a block diagram showing a third step of the algorithm of the EC2 network.

The third step of the network algorithm will now be described with reference to FIG. 34.

[3] The node device outputs, after the minimum packet interval (4 μs), the preamble having the minimum length (1.7 μs) via the low-order direction port which was interrupted. In FIG. 34, the node device $\mathbf{31}a_3$ is operating in this manner.

[3] When the node device receives a packet via the high-order direction port after detecting the SFD of the packet via the low-order direction port, it outputs the packet via the high-order direction port to the low-order direction first-arrival input port, and interrupts the outputting via the other low-order direction ports for the minimum packet interval (4 μs). Then the node device stores frames of the packet subsequent to its SFD. In FIG. 34, the node devices $\mathbf{31}a_1$ and $\mathbf{31}b_1$ are operating in the above manner.

[3] When no packet becomes available, the node device is initialized for the minimum packet interval (4 μs), and becomes capable of receiving a new packet. In FIG. 34, the node device $\mathbf{31}a_2$ is operating in this manner.

[1] The transmit/receive station which detects a collision is initialized during that time, and becomes capable of receiving a new packet. In FIG. 34, the transmit/receive station 32*a* is operating in this manner, that is, operating in the same manner as the transmit/receive station 32*f* in the aforementioned second step.

Figure 35:
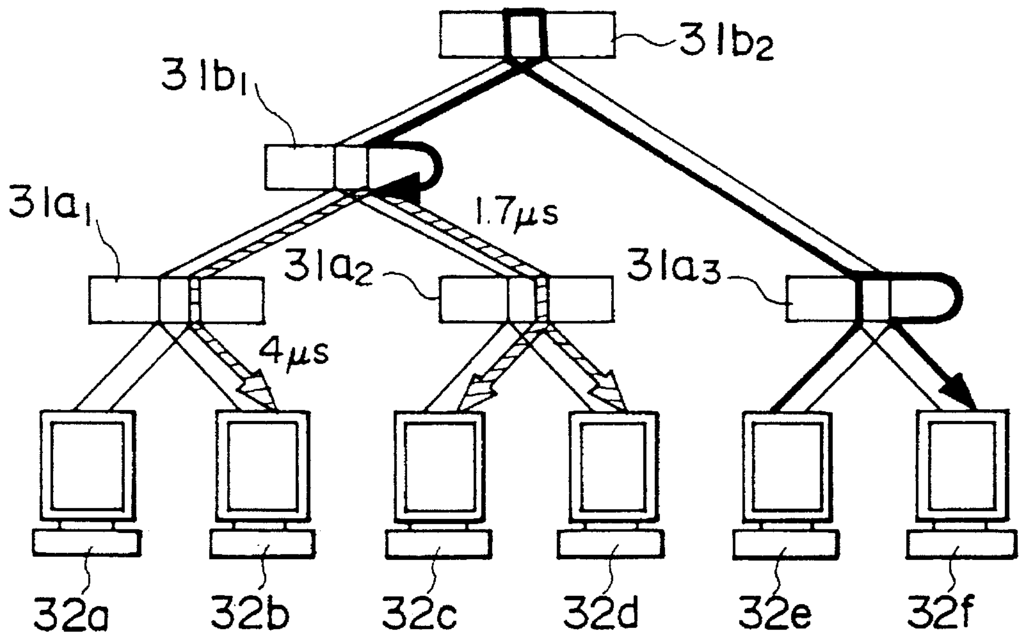
FIG. 35 is a block diagram showing a fourth step of the algorithm of the EC2 network.

The fourth step of the network algorithm will now be described with reference to FIG. 35.

[3] The node device outputs the preamble having the minimum length (1.7 μs) and outputs the frames stored after the SFD via the low-order direction port which was interrupted. In FIG. 35, the node device 31$a_3$ is operating in this manner.

[3] The node device outputs, after the minimum packet interval (4 μs), the preamble having the minimum length (1.7 μs) via the low-order direction port which was interrupted. In FIG. 34, the node devices 31$a_1$ and 31$b_1$ are operating in this manner, that is, in the same manner as the node device 31$a_3$ in the aforementioned third step.

[2] When the jam signal from the transmit/receive station ends, the node device interrupts the outputting via the low-order direction port for the minimum packet interval (4 μs). If there are frames of the packet received, subsequent to the SFD thereof, via the selected first-arrival input port, the node device stores these frames. In FIG. 35, the node 31$a_1$ is operating in this manner, that is, operating in the same manner as the node device 31$a_3$ in the aforementioned second step.

[1] The transmit/receive station which detects a collision is initialized during that time, and becomes capable of receiving a new packet. In FIG. 35, the transmit/receive station 32$a$ is operating in this manner, that is, operating in the same manner as the transmit/receive station 32$f$ in the aforementioned second step.

Figure 36:
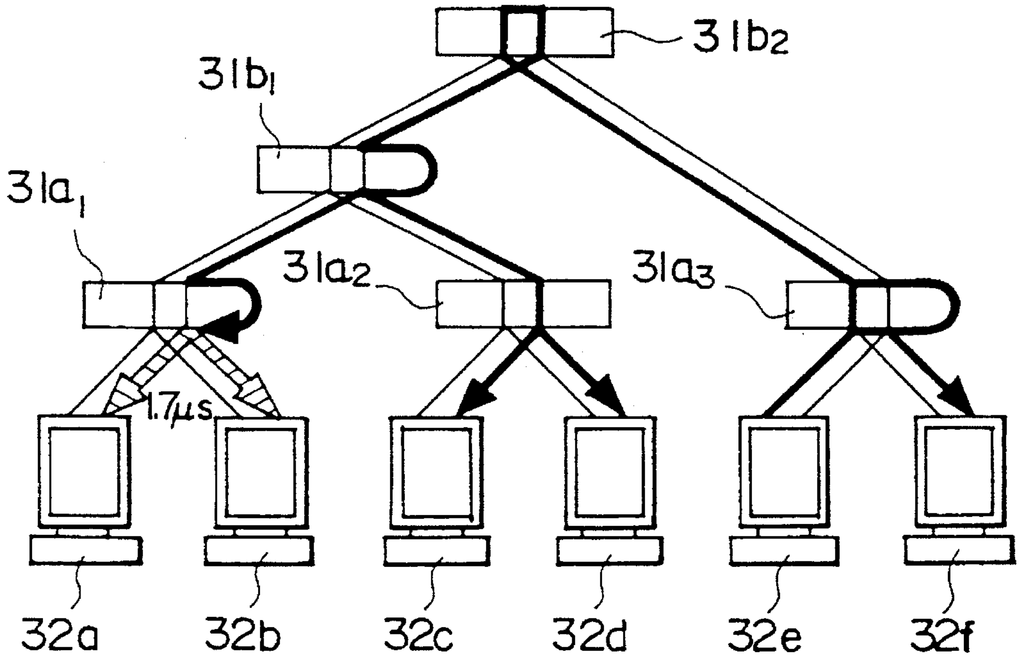
FIG. 36 is a block diagram showing a fifth step of the algorithm of the EC2 network.

The fifth step of the network algorithm will now be described with reference to FIG. 36.

[3] The node device outputs the preamble having the minimum length (1.7 μs) and then outputs the frames stored after the SFD to the low-order direction port which was interrupted. In FIG. 36, the node device 31$b_1$ is operating in this manner, that is, in the same manner as the node device 31$a_3$ in the aforementioned fourth step.

[3] The node device outputs, after the minimum packet interval (4 μs), the preamble having the minimum length (1.7 μs) via the low-order direction port which was interrupted. In FIG. 36, the node device 31$a_1$ is operating in this manner, that is, in the same manner as the node device 31$a_3$ in the aforementioned fourth step and the node devices 31$a_1$ and 31$b_1$ in the aforementioned fourth step.

Figure 37:
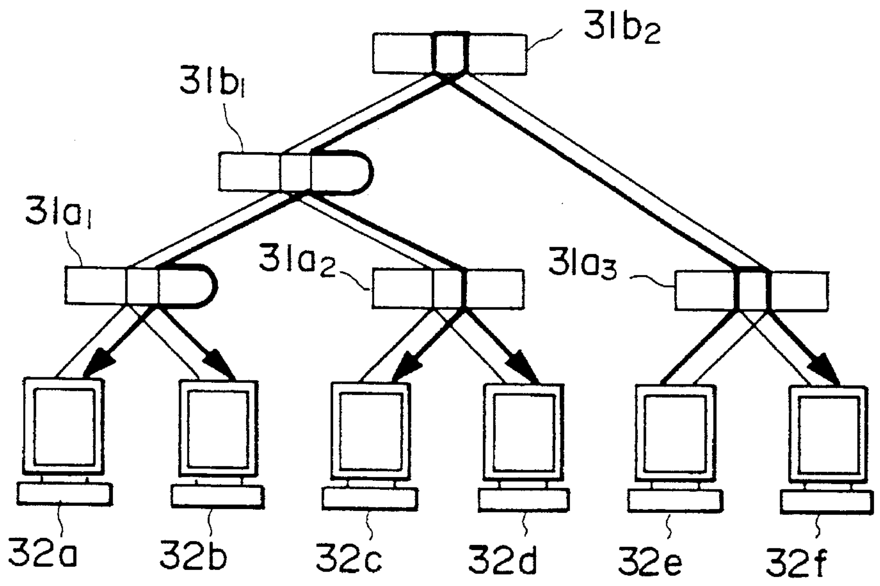
FIG. 37 is a block diagram showing a sixth algorithm of the EC2 network.

Finally, the sixth of the network algorithms will be described with reference to FIG. 37.

[3] The node device outputs the preamble having the minimum length 1.7 μs, and then outputs the frames stored after the SFD via the low-order direction port which was interrupted. In FIG. 37, the node device 31$a_1$ is operating in this manner, that is, in the same manner as the node device 31$a_3$ in the aforementioned fourth step and the node device 31$b_1$ in the aforementioned fifth step.

In the above-mentioned manner, the packet which is the first arrival packet with respect to the highest-order node device 31$b_2$ is broadcasted in the network, and is received by all the transmit/receive stations 32$a$–32$f$ while other packets are excluded or discarded.

According to the network algorithm of the EC2 of the sixth embodiment of the present invention, the node 31 outputs the selected packet to all the ports other than the port selected, and hence only one packet is allowed to be propagated through the network.

When each of the node devices 31 (31$a_1$–31$b_2$) receives an input packet at the high-order direction port after detecting the SFD of the input packet at the low-order direction port, it stores the input packet at the high-order direction port, and interrupts the outputting of the packet from the low-order direction port for the minimum packet interval (4 μs). In this manner, the selected packet (the input packet at the high-order direction port) is correctly transferred to the low-order direction port.

The node device 31$a$ to which the transmit/receive station 32 is connected via the low-order direction port stores the selected packet (the packet at the first-arrival input port or the input packet at the high-order direction port) when a collision has occurred therein, and interrupts the outputting from the low-order direction port thereof for the minimum packet interval (4 μs) after the end of the jam signal from the transmit/receive station 32. In this manner, the selected packet is correctly transferred to the transmit/receive station 32 at which the collision of packets has occurred.

We will compare the algorithm of the EC2 with the prior art disclosed in the Japanese Patent Publication No. 58-40384, which is one of the CSMA techniques intended to prevent loss of packets due to collisions of packets. Both the EC2 and the prior art have the tree-like hierarchical structures, and loss of packets is prevented by controlling the whole network by the first-arrival packet which arrives at the highest-order node device first.

A description will now be given of differences among the 10BASE-T system, the prior art disclosed in the above publication, and the EC2 system.

Figure 38A:
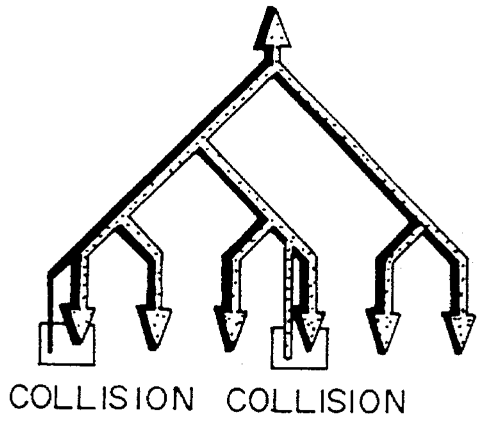
FIGS. 38A, 38B and 38C are diagrams showing routing algorithm of the 10BASE-T system, Japanese Patent Publications No. 58-40384, and the EC2 system, respectively.
Figure 38B:
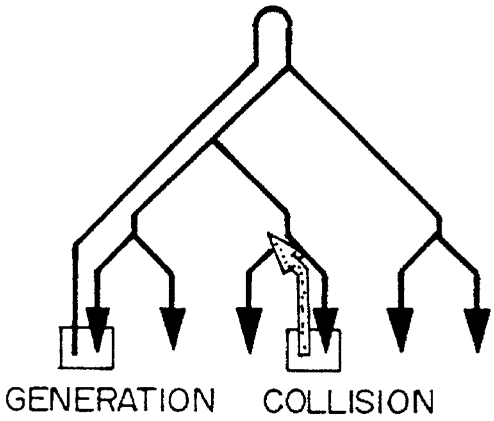

The physical topology of the 10BASE-T has a hierarchical tree structure as shown in FIG. 38A, and the logical topology thereof is a bus structure. When a collision occurs in which a plurality of communications concur, interference takes place and thus all packets are lost. The transmit station performs collision detection by detecting the carrier at the time of transmission. The routing algorithm of the prior art disclosed in the above publication is shown in FIG. 38B. As shown in FIG. 38B, the first-arrival packet is output in the high-order direction, and is broadcasted in the low-order direction after it is received by the highest-order node device. In this manner, the selected packet is transferred to all the transmit/receive stations. Each transmit/receive station performs collision detection by comparing the transmit packet and the receive packet returned. That is, it is required that each transmit/receive station has the full-duplex communications function and the specific collision detection system. Thus, the prior art is not compatible with the existing LAN protocols, such as the Ethernet.

Figure 38C:
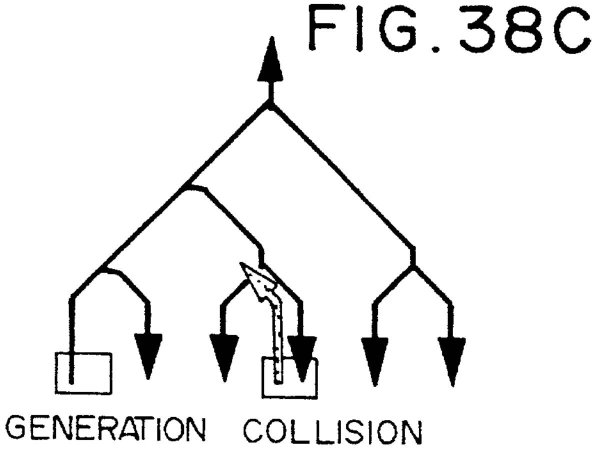

The routing algorithm of the EC2 of the sixth embodiment of the present invention is shown in FIG. 38C, in which the first-arrival packet is output in the high-order direction and the other low-order direction. Then, the collision detection is carried out by detecting the carrier at the transmit station.

Figure 26:
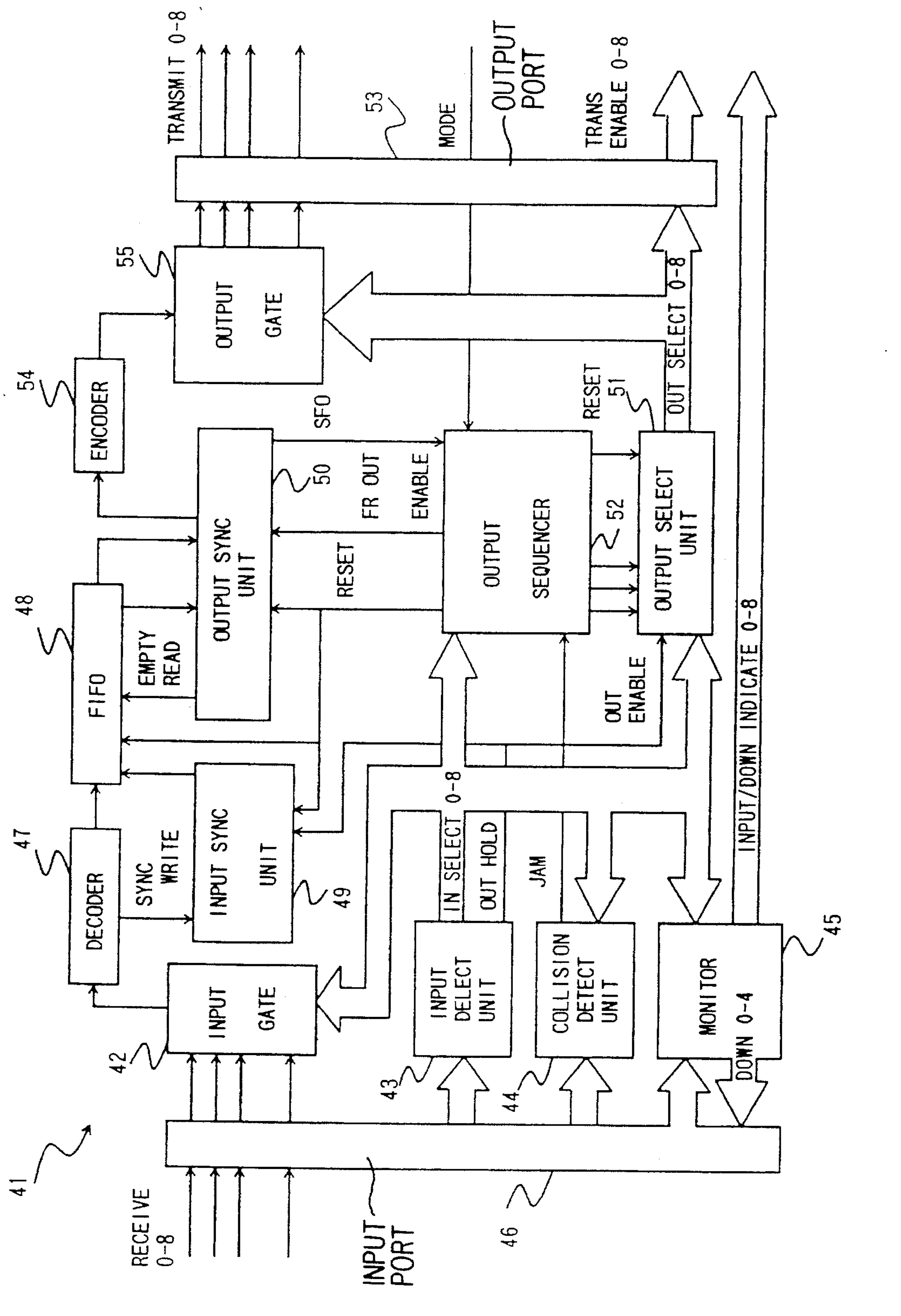
FIG. 26 is a block diagram of the EC2 node device according to a sixth embodiment of the present invention.

An exemplary structure of the node device 31 of the EC2 will now be described. The node device 31 comprises a device called "Node Kernel", and an interface (I/F) device of the 10BASE-T. A multiport node device is configured by using a plurlaity of printed circuit boards, each having the Nude Kernel device and the I/F device. FIG. 26 shows a Node Kernel device 41, in which the above-mentioned algorithms of the EC2 are implemented. As shown in FIG. 26, the Node Kernel device 41 includes an input port 46, which connects receive ports 0–8 to an input gate 42, an input detection unit 43, a collision detection unit 44 and a monitor 45. CGcontrol signals (Down 0–8) regarding the monitor 45 are used to interrupt connections to units other than a monitor of a failure port. Out of the receive ports 0–8, the receive port 0 is a high-order direction port, and receive ports 1–8 are low-order direction port.

The input gate 42 functions to make connection between the decoder 47 and the input port which is selected by control signals (In Select 0–8) regarding the input detection unit 43. The input detection unit 43 functions as an input control device, which detects the first-arrival low-order direction port, and determines whether or note there is an input signal at the high-order direction port. Further, the input detection unit 43 generates control signals (In select 0–8) and a control signal (Out Hold). The collision detection unit 44 detects input signals received at the ports which are not selected by the control signals (In Select 0–8) regarding the input detection unit 43, and generates the jam signal.

An FIFO memory 48, which functions as a storage device, is provided in the device 41. An input sync unit 49 is provided which functions to write the output signal of the decoder 47 into the FIFO memory 48. The input sync unit 49 inhibits, by the output control signal (Out Hold), the write operation on the FIFO memory 48 until the outputting of packets is completed. There is provided an output sync unit 50, which controls the read operation of the FIFO memory 48, preamble deleting and SFD detecting. The output sync unit 50 is a part of the output controls device, and further control outputting of the preamble, and synchronous outputting in which the frames after the SFD is synchronized with the preamble by a control signal (Fr Out Enable) regarding an output select unit 51. The output select unit 51, which is a part of the output control unit, selects an output port relating to an input port which is not selected by the control signals (In Select 0–8) regarding the input detection unit 43, and maintains the above selection in response to the control signal (Out Hold) until the outputting of the packet is completed. The device 41 further includes an output sequencer 52 and an output port 53. In addition to the above-mentioned function of the output select unit 51, it controls the output port 53 having ports respectively related to control signals (Out Enable) from the output sequencer 52.

The device 41 has an output gate 55, which connects, in response to the control signals (Out Select 0–8) regarding the output select unit 51, the output of an encoder 54 connected to the output sync unit 50 to the selected output port 53. The aforementioned output sequencer 52 controls the first-arrival low-order direction input port and other low-order direction ports (in addition thereto, the collision port may be distinguished therefrom) by the respective sequencies at the respective output ports 53 by using the control signals (In Select 0–8) from the input detection unit 43, a control signal (Jam) from the collision detection unit 44, and the control signal (SFD) from the output sync unit 50. The setting of a mode station (MODE) is carried out based on whether the node device is connected to the low-order direction port or the transmit/receive station, that is, depending on whether the node device is the station-connected node device 31*a* or the node-connected node device 31*b*.

The EC2 system of the sixth embodiment of the present invention has the following advantages. Firstly, a high line activity and superior delay characteristic can be obtained at heavy traffic, and it becomes possible to construct a system which makes the most of the processing capabilities of transmit/receive stations and servers. Secondly, there is no degradation in the performance due to collisions, and thus it is possible to construct a practical system which has a huge number of transmit/receive stations and a long network length (of course, these must meet the standards) and which will often have collisions. Thirdly, the EC2 system has an excellent interchangeability with the Ethernet, and thus transmit/receive terminals having the protocol of the Ethernet can be connected thereto without any change. Further there is no practical problem regarding the high-order protocol and applications.

A description will now be given of numerical evaluation of the above-mentioned effects of the EC2 system. The following is intended to show how much the performance obtained at heavy traffic is improved, as compared with the conventional Ethernet. There is known, as means for evaluating the CSMA/CD Ethernet, an analysis method based on "PERFORMANCE EVALUATION OF CSMA/CD SYSTEM TAKING INTO ACCOUNT BACK-OFF PROTOCOL", Transactions of the Institute of Electronics and Communication Engineers, '84/2, Vol. J67-D No. 2). Here, the performance of the EC2 and the conventinal Ethernet will be evaluated by referring to the above analysis method.

Figure 39:
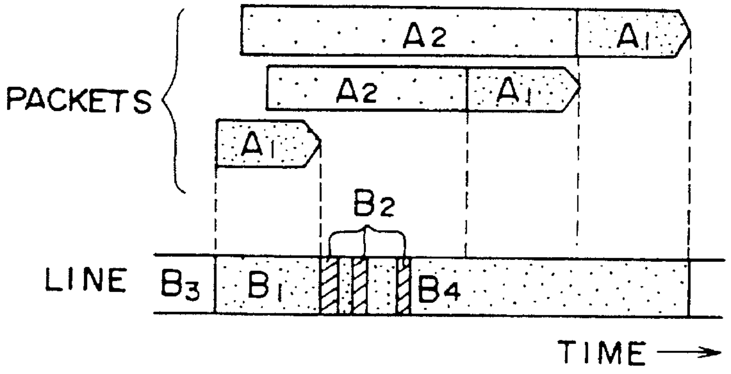
FIG. 39 is a diagram showing states of packets and lines in order to clearly show definitions for evaluation.

The EC2 of the sixth embodiment of the present invention is intended to improve the line activity (efficiency) and the delay characteristic. Hence, only the line activity and the delay characteristic will be described below. Now, the line activity will be defined as follows. As shown in FIG. 39, the state of lines of the network is categorized into either a real transfer state $B_1$ or non-transfer state when the state of a packet is categorized into either a real transfer state $A_1$ or a standby state $A_2$. In the real transfer state $B_1$, a packet is being transferred. In the non-transfer state, no packet is being transferred. The non-transfer state is categorized into either an empty state or a collision $B_2$. The empty state is categorized into either a totally empty state $B_3$ in which there is no standby packet, or an empty-running state B4 (an empty state due to back-off). An access time is defined as the time necessary for the empty-running state $B_4$ and the collision $B_2$. The line activity is the rate of the real transfer state B1 occupied on the line. The "delay" in the delay characteristic is defined as the ratio of the transfer time (necessary for completing a transfer of a packet after it is generated) and the real transfer time (necessary for acquiring a channel and completing the transfer).

Referring to FIG. 39, the above parameters for performance evaluation are described as follows:

Line activity=(real transfer time)/{(real transfer time)+(access time)+(empty time)}, Transfer time=(standby time)+(real transfer time), Delay=(real transfer time)/(transfer time).

Using the above definitions of the terms, the Ethernet and the EC2 are respectively modeled and then evaluated.

(1) Channel capacity; C[bits/sec]

(2) Number of stations; N (3) Maximum distance between stations; Dis [km]

(4) Signal propagation speed; $2\times10^5$ [km/sec]

(5) The time axis is considered as being a string of time slots. Stations are each synchronized with each other. Each station starts to transmit a packet at the beginning of a slot. A slot length S1 (propagation delay) is described as follows:

$$S1=2\cdot Dis/2\times10^5[sec/slot].$$

(6) The packet length is fixed to Lp[bits]. The packet length normalized by the slot length is defined as follows:

$$Lps=Lp/C\cdot S1$$

where fractions less than 1 are counted as a whole number.

(7) The rate of occurrence of packets depends on the Poisson distribution, and 1 packets are generated per transmit/receive station for one second on an average. Thus, the number of packets, σ, generated within one slot per transmit/receive station is as follows:

$$\sigma\text{–}\lambda\cdot S1[packets/slot].$$

However, it is assumed that only one packet is newly generated in one slot in the whole network.

(8) When a collision of packets occurs, the necessary process is completed within the time slot in which the collision occurs, and a packet can be transmitted or received in an immediately subsequent slot.

(9) The number i of stations which have packets at the beginning of each slot and the number of collisions m are used as state variables.

(10) The number m of collisions changes as follows.

(10-1) When a collision occurs in the network, all the stations detect the collision, and add 1 to the respective numbers m of collisions where m is equal to or smaller than Mmax and 1 is not added when m=Mmax.

(10-2) When the transmitting of a packet has been successful, the numbers m of collisions respectively managed by all the stations are reset to zero.

By the above definition of the number m of collisions, the number m of collisions in the EC2 is always zero.

(11) When the state of the network is (1, m), the probability that each packet keeping station transmits a packet depends on a BEB (Binary Exponential Backoff) algorithm. The above probability is equal to $2^{-m}$ for $0 \leqq m \leqq Mmax$, and equal to $2^{-Mmax}$ for m>M.

A description will now be given of the evaluation by means of theoretical analysis and numerical analysis. First, the theoretical analysis will be described. The concept "cycle" will now be introduced as a time unit. One cycle is the time between the end of transfer of a packet and the end of transfer of a next packet. When i (the state of the network) is larger than or equal to 1 at the first slot of the cycle, one cycle is equal to the sum of the access time and the real transfer time. When i=0 in the first slot of the cycle, one cycle is equal to the sum of the access time, the transfer time and the standby time until one packet is generated. During the standby time, a new packet is not generated and a standby packet does not exist. Hence, the analysis must be carried out taking into account the above.

Out of the theoretical analyses, a cycle length analysis will now be described. In the Ethernet, the following probabilities can be defined as follows:

$$Ps(i,m)=1Pd(i,m)\{1-Pd(i,m)\}^{(i-1)}$$

$$Pid(i,m)=\{1-Pd(i,m)\}^{i}$$

$$Pc(i,m)=1-Ps(i,m)-Pid(i,m)$$

$$Pa(i,m)=1-e^{(N-1)\sigma}$$

where Ps(i,m) denotes a probability that an arbitrary station acquires a channel in a certain slot, Pid(i,m) denotes a probability of the empty-running state, Pc(i,m) denotes a probability that a collision occurs, and Pa(i,m) denotes a probability that a packet is generated. When the state of the network is (i, m), a probability Pacc(k/i,m) that a station acquires a channel after k slots can be expressed in the following manner by the combination of events on the network (channel acquisition, empty running, collision) and generation of a new packet at the slot being considered:

$$\begin{aligned} Pacc(k/i,m) &= Ps(i,m) \qquad k=l \\ &= Pacc(k/i,M\mathrm{max}) \qquad m > M\mathrm{max} \\ &= Pid(i,m)\{l-Pa(i,m)\}Pacc(k-1)/i,m) + \\ &\quad Pid(i,m)Pa(i,m)Pacc(k-l/i+1,m) + \\ &\quad Pc(i,m)\{l-Pa(i,m)\}Pacc(k-l)/i,m+1) + \\ &\quad Pc(i,m)Pa(i,m)Pacc(k-l)/i+l,m+1). \end{aligned}$$

Thus, an expected value Tacc(i) of the access time obtained when the number i of stations which have packet is expressed by the following formula:

$$Tacc=\Sigma k\ Pacc(k/i,0)i \geqq 1.$$

For i (state)=0, the standby time continues until one packet is generated. After one packet is generated, the operation is the same as that for i=1. Hence, the access time for i=0 is equal to the access time for i=1.

The real transfer time is the time during which a packet is actually being transferred. The present analysis assumes that the packet length is constant, and hence the real transfer time does not change.

As a result, the cycle length Tcyc(i) of the Ethernet is described as follows:

$$\begin{aligned} Tcyc(i) &= Tcyc(1)+(l-e^{-\sigma pt}) \quad i=0 \\ &= Tacc(i)+Lps \quad i \geqq l. \end{aligned}$$

The cycle length for i=0 includes the access time, the real transfer time and the standby time.

Next, a state analysis out of the theoretical analyses will be described. That is, the probability that the network in state i at the beginning of each cycle. A state series of the network at the beginning of each cycle forms a hidden Markov chain. Further, the cycle length is also a probability variable dependent on state i. Here, in order to simplify the analysis, the following approximation will be introduce:

[The cycle length depends on state i at the time of the cycle, and is equal to the mean cycle length.]

By this approximation, the state transition probability Pt(j/i) of the hidden Markov chain is expressed by the following formula:

$$\begin{aligned} Pt(j/i) &= 0 \qquad j<i-1 \\ &= Pt(j/l) \qquad i=0,\ j=0 \\ &= {}_{N-1}C_{j-i+l}(e^{-\sigma Tcyc(i)})^{N-j-1.} \\ &\quad (l-e^{-\sigma Tcyc(i)})^{j-i+l} \end{aligned}$$

In the cycle starting in state 0, the standby time continues until one packet is generated, and there is no state transition within the standby time. After one packet is generated, the above cycle is equal to the cycle starting in state 1. Hence, the probabilities Pt(j/0) and Pt(j/1) become equal to each other. A stationary probability is a solution of the following equation:

$$\pi = P\pi$$

$$\sum_{i=0}^{N-l} \pi i = l$$

where $\pi$ is a stationary state probability vector $\pi=\{\pi_i\}$(i=1,2, . . . , N-1), and a state transition probability matrix P={Pji}.

By the above cycle length analysis and the state analysis, the line activity and the delay characteristic can be obtained. The line activity Tp is defined as follows:

$$Tp = Lps / \sum_{i=0}^{N-l} Tcyc(i) fi.$$

Next, in order to obtain the mean delay characteristic of the network, the mean transfer time must be obtained. This is equal to the mean total number of stations which keep packets in one cycle. First, a probability Q(j/i,k) that the number of stations which have packets after k slots in the cycle starting in state i:

$$\begin{aligned} Q(j/i,k) &= 0 \quad j < i \\ &= {}_{N-l}C_{j-l}^{(l-e^{-k\sigma})^{j-i} e^{-k\sigma(N-j)}}. \end{aligned}$$

The expected value Qex(i,k) of the number of stations which have packets after k slots in the cycle starting in state i is expressed as follows:

$$Qex(i,k) = \sum_{j=l}^{N} j\, Q(j/i,k).$$

Thus, the expected value S(i) of the total number of stations which have in the cycle starting in state i is written as follows:

$$\begin{aligned} S(i) &= S(l) \quad i = 0 \\ &= \sum_{i=l}^{Tcyc(i)} Qex(i,k) \quad i \geqq l \\ &= NTcyc(i) - (N-l)(l - e^{-\sigma Tcyc(i)}) / \\ &\quad (l - e^{-\sigma}) i \geqq 1. \end{aligned}$$

Thus, the mean total number A of stations which have packets is expressed by the following formula:

$$A = \sum_{i=0}^{N-l} S(i) \; i$$

where A is the expected value of the total number of stations which have packets in a mean cycle time. The expected value A is equal to the time necessary to complete a transfer of a packet from the time when it is generated. Hence, the delay characteristic D is obtained as follows by dividing A by the real transfer time Lps:

$$D = A/Lps.$$

A description will now be given of the results of evaluation of the EC2 and the Ethernet by actually substituting numerical values for the parameters used in the above-mentioned theoretical analyses. The parameters are set as follows:

Number of channels; $10\times10^6$ [bits/sec]

Maximum length between stations; 1 [km]

Packet length; 600 [bits] [=75 bytes]

1200 [bits] [=1500 bytes].

Figure 40:
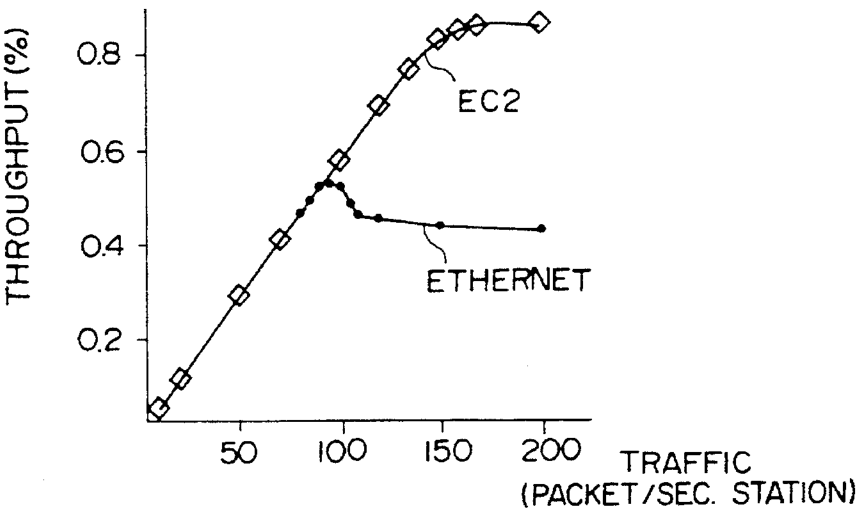
FIG. 40 is a graph showing the results of a numerical analysis of a traffic-line activity.
Figure 41:
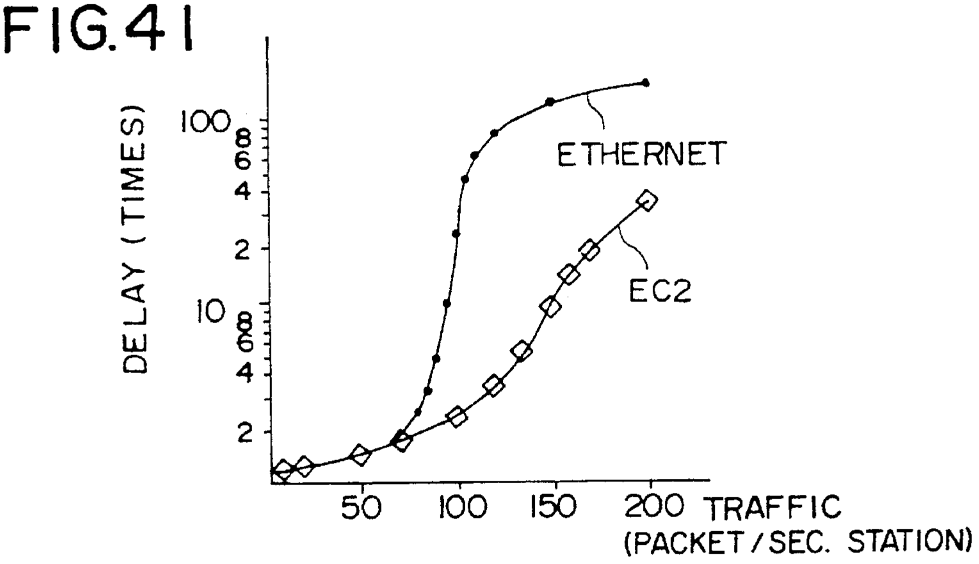
FIG. 41 is a graph showing the results of a numerical analysis of a traffic-delay characteristic.
Figure 42:
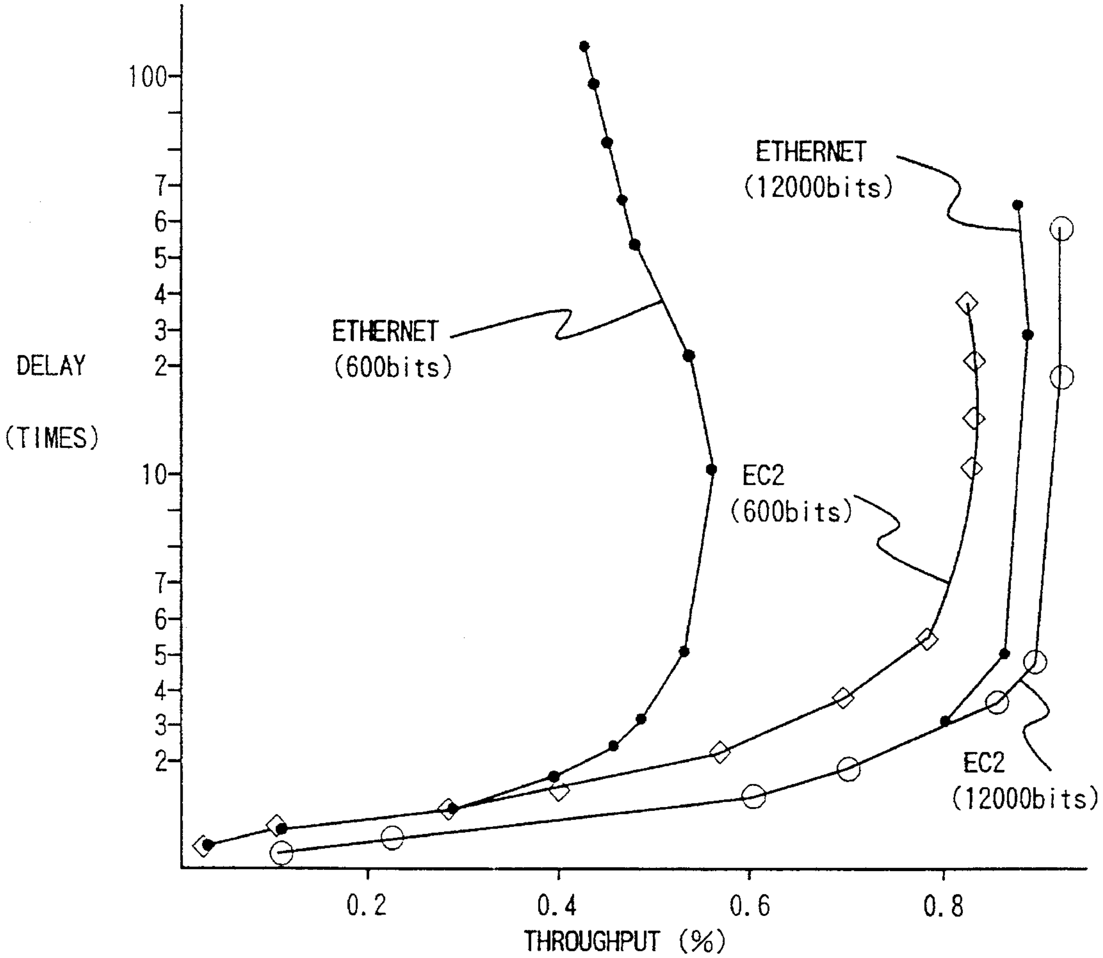
FIG. 42 is a graph showing the results of a numerical analysis of a line activity-delay characteristic.

FIG. 40 is a graph showing the line activity as a function of traffic, and FIG. 41 is a graph of a delay characteristic as a function of traffic. The analyses shown in FIGS. 40 and 41 are obtained for a packet length of 600 bits. FIG. 42 shows line activity-delay characteristic with the packet length set equal to 600 bits and 12000 bits.

The results shown in FIGS. 40 through 42 will now be examined. The following document reports the actual measurement of traffic in the Ethernet ("TRAFFIC ACTUAL MEASUREMENT EXAMINATION IN ETHERNET", Fuji Xerox Technical Report No. 2, 1987). This examination was conducted under a condition in which 350 workstations and various servers were coupled to each other on the XNS protocol. According to the above document, the maximum load is equal to 12%, and most of the packet lengths are packets each having the minimum packet length and packets each having the maximum packet length. However, the computer ability used in the examination made it possible to generate a 2–3% load in a file transfer by one host computer.

Referring to the report of the above document, the above evaluated range and an advantage of the EC2 over the Ethernet will now be examined. The examination of the packet length shows that the evaluated values are proper. The examination of the loads does not show an advantage of the EC2 over the Ethernet. However, nowadays, the computer ability has been improved to generate a 90% load by even one workstation. Further, the workstations are used in such a manner that a large number of packets each having the minimum packet length are generated. With the above in mind, the evaluated values regarding the load are proper, and hence it is concluded that the EC2 is useful.

The model of the EC2 does not have back-off since the number of collisions are always zero. However, in actuality, the number of collisions is counted for easy station, and thus the influence of the back-off algorithm appears. This outwardly reduces the number of stations which keep packets. Hence, an empty-running time occurs, and the delay may increase. However, degradation of the delay characteristic is not inherent in the EC2, and occurs in the Ethernet in the same manner. Hence, the degradation of the delay characteristics does not influence the advantage of the EC2 over the Ethernet.

According to the present invention, the input signal which is the first-arrival signal at the highest-order node device is propagated through the network without being destroyed in any case. Hence, ideal throughout characteristics can be obtained at heavy traffic.

The present invention is not limited to the specifically disclosed embodiments, and variations and modifications may be made without departing from the scope of the present invention.

What is claimed is:

1. A method of controlling a communications network which includes a plurality of node devices connected so that a tree-like hierarchical structure is formed, each of said node devices having a single high-order direction port and a plurality of low-order direction ports, the communications network including a plurality of transmit/receive stations each being connected to one of the node devices via an interface device, each of the transmit/receive stations having an input port and an output port connected to the node devices via the interface and transmitting a signal when there is no signal at the input port, a highest-order node device out of the node devices in the communications network broadcasting a first-arrival signal which is received by said highest-order node device, said first-arrival signal being one of signals which are transmitted by some of transmit/receive stations at almost the same time, signals other than the first-arrival signal being discarded, said method comprising the steps of:

(a) storing, in a buffer provided in said interface device and arranged so as to receive a signal via said one of the node devices, a first input signal received by said interface device from said one of the node devices approximately concurrently with a second input signal received by said interface device from one of the plurality of transmit/receive stations; and (b) transmitting the first input signal received from said one of the node devices and stored in said buffer in the step (a), to a destination transmit/receive station after the second input signal from said one of the plurality of transmit/receive stations is no longer received;

wherein the buffer comprises a FIFO memory and further comprising the steps of:

(c) storing said first input signal received from said one of the node devices into a first input of the FIFO memory provided in the interface device, said FIFO memory having a second input parallel to the first input;

(d) writing a space signal into the second input of the FIFO after the first input signal ends;

(e) transmitting a collision presence signal from the interface device to said one of the transmit/receive stations which transmits the second input signal when the first input and the second input signal arrive at the interface device at almost the same time; and (f) transmitting the first input signal written into the first FIFO input to said one of the plurality of transmit/receive stations which transmits the second input signal in response to receipt of the collision presence signal.

2. A method as claimed in claim 1, further comprising the step (h) of directly transmitting, from the interface device, an input signal received from one of the node devices to one of the transmit/receive stations in a state where no second input signal is received at the interface device.

3. An interface device provided between one of a plurality of node devices and a transmit/receive station, said node devices being connected so that a communications network of a tree-like hierarchical structure is formed, said transmit/receive station having an input port and an output port connected to the interface device and transmitting a signal when there is no signal at the input port, a highest-order node device out of the node devices in the communications network broadcasting a first-arrival signal which is received by said highest-order node device, said first-arrival signal being one of signals which are transmitted by other transmit/receive stations at almost the same time, signals other than the first-arrival signal being discarded, said interface device comprising:

a buffer comprising a FIFO memory receiving a first signal from one of said node devices, said first signal being transmitted to said transmit/receive station;

a system receiving a second signal from said transmit/receive station and transmitting said second signal to said one node device without any buffering; and control means connected to the buffer for controlling the buffer so that the first input signal received from the node device and stored in said buffer is transmitted to the transmit/receive station after the second input signal from said transmit/receive station is no longer received;

wherein the FIFO memory comprises a first input to store the first input signal, and a second input in parallel with the first input to store a space signal after the first input signal ends.

4. The device as claimed in claim 3, wherein the interface device further comprises a collision port for transmitting a collision presence signal from the interface device to said transmit/receive station which transmit the second input signal when the first input signal and the second input signal arrive at the interface device at almost the same time.

5. The device as claimed in claim 3, wherein the interface device further comprises an output port coupled to one of the input ports of said transmit/receive station, for transmitting a collision presence signal from the interface device to said transmit/receive station which transmits the second input signal when the first input signal and the second input signal arrive at the interface device at almost the same time.

* * * * *